(12) United States Patent
Kempanna et al.

(10) Patent No.: US 12,301,461 B2
(45) Date of Patent: May 13, 2025

(54) DYNAMICALLY PROCESSING DATA MESSAGE FLOWS USING DIFFERENT NUMA NODES OF A PROCESSING SYSTEM

(71) Applicant: VMware LLC, Palo Alto, CA (US)

(72) Inventors: Raghav Kempanna, Santa Clara, CA (US); Tathagat Priyadarshi, Bangalore (IN); Vipin Padmam Ramesh, Nagercoil (IN); Kumara Parameshwaran Rathnavel, Bangalore (IN); Srinivasa Srikanth Podila, Bangalore (IN); Rajagopal Sreenivasan, Bangalore (IN); Samar Yadav, Bengaluru (IN)

(73) Assignee: VMWare LLC, Palo Alto, CA (US)

( * ) Notice: Subject to any disclaimer, the term of this patent is extended or adjusted under 35 U.S.C. 154(b) by 0 days.

(21) Appl. No.: 18/373,568

(22) Filed: Sep. 27, 2023

(65) Prior Publication Data

US 2025/0023820 A1   Jan. 16, 2025

(30) Foreign Application Priority Data

Jul. 12, 2023   (IN) .............................. 202341046835

(51) Int. Cl.
*H04L 47/125*   (2022.01)
*H04L 47/24*   (2022.01)

(52) U.S. Cl.
CPC ............ *H04L 47/125* (2013.01); *H04L 47/24* (2013.01)

(58) Field of Classification Search
CPC .............................. H04L 47/125; H04L 47/24
See application file for complete search history.

(56) References Cited

U.S. PATENT DOCUMENTS

| 7,430,755 | B1 * | 9/2008 | Hughes | ................. H04L 9/3263 726/4 |
| 2014/0310390 | A1 * | 10/2014 | Sorenson, III | .......... H04L 47/10 709/223 |
| 2017/0168715 | A1 * | 6/2017 | Eshwarappa | ....... G06F 9/45558 |
| 2019/0173785 | A1 * | 6/2019 | Kameyama | ............. H04L 45/74 |

* cited by examiner

*Primary Examiner* — Hua Fan
(74) *Attorney, Agent, or Firm* — Quarles & Brady LLP

(57) ABSTRACT

Some embodiments provide a novel method for dynamically processing data message flows using different non-uniform memory access (NUMA) nodes of a processing system. Each NUMA node includes a memory and processors that can access data other memories of other NUMA nodes. A load balancing application associated with a first NUMA node receives flows destined for an endpoint application. The flows are assigned to the first NUMA node to be forwarded to the endpoint application. The load balancing application monitors a central processing (CPU) usage of the first NUMA node to determine whether the CPU usage of the first NUMA node exceeds a particular threshold. When the CPU usage of the first NUMA node exceeds the particular threshold, the load balancing application reassigns at least a subset of the flows to the second NUMA node for processing.

19 Claims, 12 Drawing Sheets

DYNAMICALLY PROCESSING DATA MESSAGE FLOWS USING DIFFERENT NUMA NODES OF A PROCESSING SYSTEM

BACKGROUND

Modern servers with two or more processors employ architectures with multiple sockets, each with processor cores, memory, etc., that operate on a single motherboard. Some multi-socket architectures use a non-uniform memory architecture (NUMA) for memory access by the multiple processors of the multiple sockets. NUMA allows for processors on the different sockets to have access to a memory local to the socket, while also providing access to a memory attached to a different socket (e.g., the local memory of other sockets). The memory access times for the processor cores of the different sockets varies depending on the location of the memory relative to the socket (e.g., local memory accesses are faster than remote memory accesses). Accessing memory directly attached to the socket is faster than accessing memory in remote sockets because there is a performance penalty when traversing inter-CPU links (e.g., Intel Quick/Ultra Path Interconnect (QPI/UPI)) to access memory in a remote socket.

In the network world, receiving and transmitting of data messages happens from a particular NUMA socket to which the network interface card (NIC) is attached, irrespective of the processing socket (local or remote). This leads to suboptimal performance. Load balancers process millions of data messages per second. These may be a non-deterministic distribution with multiple types of requests, and processing these over a NUMA socket can add potential jitter and increase network latency. Hence, methods and systems are needed to efficiently use resources in a NUMA system to provide a fair quality of service to applications hosted on a NUMA-based appliance.

BRIEF SUMMARY

Some embodiments provide a novel method for dynamically processing data message flows using different non-uniform memory access (NUMA) nodes of a processing system. Each NUMA node includes a local memory and a set of processors that can access data other local memories of other NUMA nodes. A load balancing application associated with a first NUMA node receives data message flows destined for an endpoint application. The data message flows are assigned to the first NUMA node to be forwarded to the endpoint application. The load balancing application monitors a central processing (CPU) usage of the first NUMA node to determine whether the CPU usage of the first NUMA node exceeds a particular threshold. When the CPU usage of the first NUMA node exceeds the particular threshold, the load balancing application reassigns at least a subset of the data message flows to the second NUMA node for processing.

In some embodiments, after reassigning at least a subset of data message flows to the second NUMA node, the load balancing application forwards the reassigned data message flows to the second NUMA node for the second NUMA node to be processed. The load balancing application then receives the processed data message flows from the second NUMA node and forwards the processed data message flows to the endpoint application. More specifically, the load balancing application directs the processors of the first NUMA node (1) to provide the reassigned data message flows to the second NUMA node and (2) to forward the processed data message flows to the endpoint application.

In some embodiments, the reassigned data message flows include large data messages such that data message flows including small data messages maintain assignment to the first NUMA node. By reassigning large data messages to be processed by the second NUMA node, the load balancing application relieves load on the first NUMA node. Conjunctively or alternatively, the load balancing application reassigns unencapsulated flows to the second NUMA node, while maintaining assignment of encapsulated flows to the first NUMA node.

The data message flows received at the first NUMA node are in some embodiments initially assigned to the first NUMA node based on quality of service (QOS) parameters (also referred to as QoS requirements, policies, or application heuristics in some embodiments) of the endpoint application. For example, the endpoint application in some embodiments requires a particular latency that the first NUMA node can provide, so the flows of that endpoint application are assigned to be processed by the first NUMA node. In some embodiments, the data message flows are initially assigned (i.e., the initial data message flow to NUMA node affinity is performed) by a network administrator. In other embodiments, the data message flows are initially assigned by the load balancing application (e.g., using a load balancing algorithm).

In some embodiments, the data message flows are initially assigned to the first NUMA node because the data message flows are critical data message flows. In such embodiments, critical flows are flows that require low latency. Critical flows are assigned to the first NUMA node in some embodiments because the first NUMA node is connected to the endpoint application, while the second NUMA node is not.

The data message flows received at the load balancing application are in some embodiments a first set of data message flows. In such embodiments, the endpoint application is a first endpoint application, and a second set of data message flows associated with a second endpoint application is assigned to the second NUMA node.

In some embodiments, the first endpoint application is implemented by a first set of endpoint application instances, and the second endpoint application is implemented by a second set of endpoint application instances. In some of these embodiments, the first and second sets of endpoint application instances execute on a same set of one or more servers. In other embodiments, the first set of endpoint application instances executes on a first set of one or more servers, while the second set of endpoint application instances executes on a second set of one or more servers. Still, in other embodiments, at least one instance of the first set of application instances and at least one instance of the second set of application instances execute on a same server.

The second set of data message flows is in some embodiments assigned to the second NUMA node because the second set of data message flows include non-critical data message flows. In such embodiments, the non-critical flows are flows not requiring a low latency. For instance, flows that have a high bandwidth can tolerate a high latency, so they can be processed by any NUMA node regardless of the latency of the NUMA node.

The load balancing application is in some embodiments a first instance of a distributed load balancing application implemented by several instances operating on the different NUMA nodes. In some embodiments, each load balancing application instance is associated with a different NUMA node. In other embodiments, each load balancing application instance is associated with a different core of the different NUMA nodes, meaning that each core is associated with its own load balancing application instance.

In some embodiments, after reassigning data message flows to the second NUMA node, the load balancing application stores a record, associating the reassigned data message flows with the second NUMA node, in the local memory of the first NUMA node. In some embodiments, the load balancing application maintains a mapping table that includes each flow and its assigned NUMA node. By maintaining this mapping table, the load balancing application knows which NUMA node is assigned to process each flow. In some embodiments, the record specifies, for each of the reassigned data message flows, a flow identifier (ID) identifying the data message flow and a NUMA node ID identifying the second NUMA node.

The data message flows in some embodiments specify a fully qualified domain name (FQDN), specifying the endpoint application, as a destination of the data message flows. In some of these embodiments, the FQDN specifies a particular endpoint application instance as the destination of the data message flows. For example, the data message flows in some embodiments specify "ABC.com/A4" as the destination of the flows. The domain name "ABC.com" specifies the endpoint application, and "A4" specifies the particular instance of the endpoint application. By specifying this as the destination, some embodiments can identify the NIC connected to the server hosting the particular instance, which is used to forward the processed flows to the particular instance.

Some embodiments provide a novel method for processing data message flows using several NUMA nodes of a processing system. Each NUMA node includes a local memory and a set of processors that can access data from local memories of other NUMA nodes. A load balancing application associated with a first NUMA node receives a data message flow destined for an endpoint application. The load balancing application determines whether the first NUMA node should perform a middlebox service operation on the data message flow that is destined to the endpoint application. Based on a determination that the first NUMA node should not process the data message flow, the load balancing application directs the data message flow to a second NUMA node for performing the middlebox service operation.

In some embodiments, the load balancing application determines whether the first NUMA node should perform the middlebox service operation based on policies that assign different priority levels to different types of flows. In some of these embodiments, the policies assign a first set of higher priority flow types to the first NUMA node while assigning a second set of lower priority flow types to the second NUMA node. The policies in some embodiments specify latency requirements of different flows, and the first set of higher priority flow types include flows requiring a low latency while the second set of lower priority flow types include flows that do not require a low latency. Conjunctively or alternatively, the policies in some embodiments specify bandwidth requirements of different flows, and the first set of higher priority flow types comprise flows requiring a high bandwidth, while the second set of lower priority flow types comprise flows that do not require a high bandwidth. The policies are received in some embodiments from a set of endpoint applications including the endpoint application to which the received data message flow. By specifying policies, each endpoint application experiences a QoS specific to its needs.

The load balancing application determines whether the first NUMA node should perform the middlebox service operation on the data message flow by determining whether the first NUMA node meets a particular policy of the endpoint application. In some embodiments, the particular policy is a latency policy, such that the load balancing application determines whether the first NUMA node has a latency that meets the latency required by the particular policy. In such embodiments, the load balancing application compares latency metrics of the first NUMA node with the latency policy, and if the latency of the first NUMA node meets the latency policy, the load balancing application determines that the first NUMA node should perform the middlebox service operation on the received flow.

If the load balancing application determines that the latency of the first NUMA node does not meet the latency policy, the load balancing application examines the other NUMA nodes to determine which other NUMA node meets the latency policy. After determining the second NUMA node meets the latency policy (e.g., based on latency metrics collected for the second NUMA node), the load balancing application directs the data message flow to the second NUMA node for performing the middlebox service operation. The middlebox service operation performed on the data message flow may be any middlebox service operation that can be performed on a data message, such as a firewall service, load balancing service, source or destination network address translation service, etc.

In some embodiments, each NUMA node accesses the data from the other local memories using a processor interconnect bridge that connects the set of processors of the NUMA node to another set of processors of another NUMA node. For instance, the first NUMA node in such embodiments provides the data message to the flow to the second NUMA node by using a processer interconnect bridge that connects the processors of the first NUMA node to the processors of the second NUMA node. In some embodiments, the processor interconnect bridge is a QuickPath Interconnect bridge. In other embodiments, the processor interconnect bridge is an Ultra Path Interconnect Bridge.

The second NUMA node performs the middlebox service operation on the data message flow using at least one of (1) data stored at a local memory of the second NUMA node and (2) data stored at a local memory of another NUMA node (e.g., a local memory of the first NUMA node and/or a local memory of a different NUMA node of the processing system). In embodiments where the second NUMA node uses data stored in its own local memory, the second NUMA node's processors directly access the local memory. In embodiments where the second NUMA node uses a local memory of another NUMA node, the second NUMA node's processors access the data through a processor interconnect bridge.

The data message flow is directed to the second NUMA node in some embodiments for processing (e.g., performing the middlebox service operation) and for forwarding the data message flow to the endpoint application. In such embodiments, the first NUMA node does not receive the data message flow back after processing and does not forward the data message flow to its destination (i.e., the endpoint application). In other embodiments, the second NUMA node provides the processed data message flow back to the first NUMA node, which then forwards the data message flow to the endpoint application.

In some embodiments, the load balancing application creates a record associating the data message flow with the second NUMA node. This record indicates that the data message flow is assigned to the second NUMA node for processing (i.e., for performing the middlebox service operation and, in some embodiments, for forwarding to the endpoint application). In some of these embodiments, the load balancing application provides the record to the second NUMA node for the second NUMA node to store in its local memory. Conjunctively, the load balancing application in some embodiments stores the record in each of the NUMA nodes of the processing system, including the first NUMA node.

The record specifies in some embodiments a flow ID identifying the data message flow and a NUMA node ID identifying the second NUMA node. In some embodiments, the flow ID is the five tuple (source network address, destination network address, source port, destination port, protocol) of the data message flow. In some embodiments, the NUMA node ID is a network address (e.g., a media access control (MAC) address, Internet Protocol (IP) address) identifying the NUMA node. In other embodiments, it is a universally unique identifier (UUID) identifying the second NUMA node. Any suitable flow IDs and any suitable NUMA node IDs may be used.

In some embodiments, the load balancing application is a first instance of a distributed load balancing application implemented by several instances operating on the several NUMA nodes. In some embodiments, each load balancing application instance is associated with a different NUMA node. In other embodiments, each load balancing application instance is associated with a different core of the different NUMA nodes, meaning that each core is associated with its own load balancing application instance.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1A:
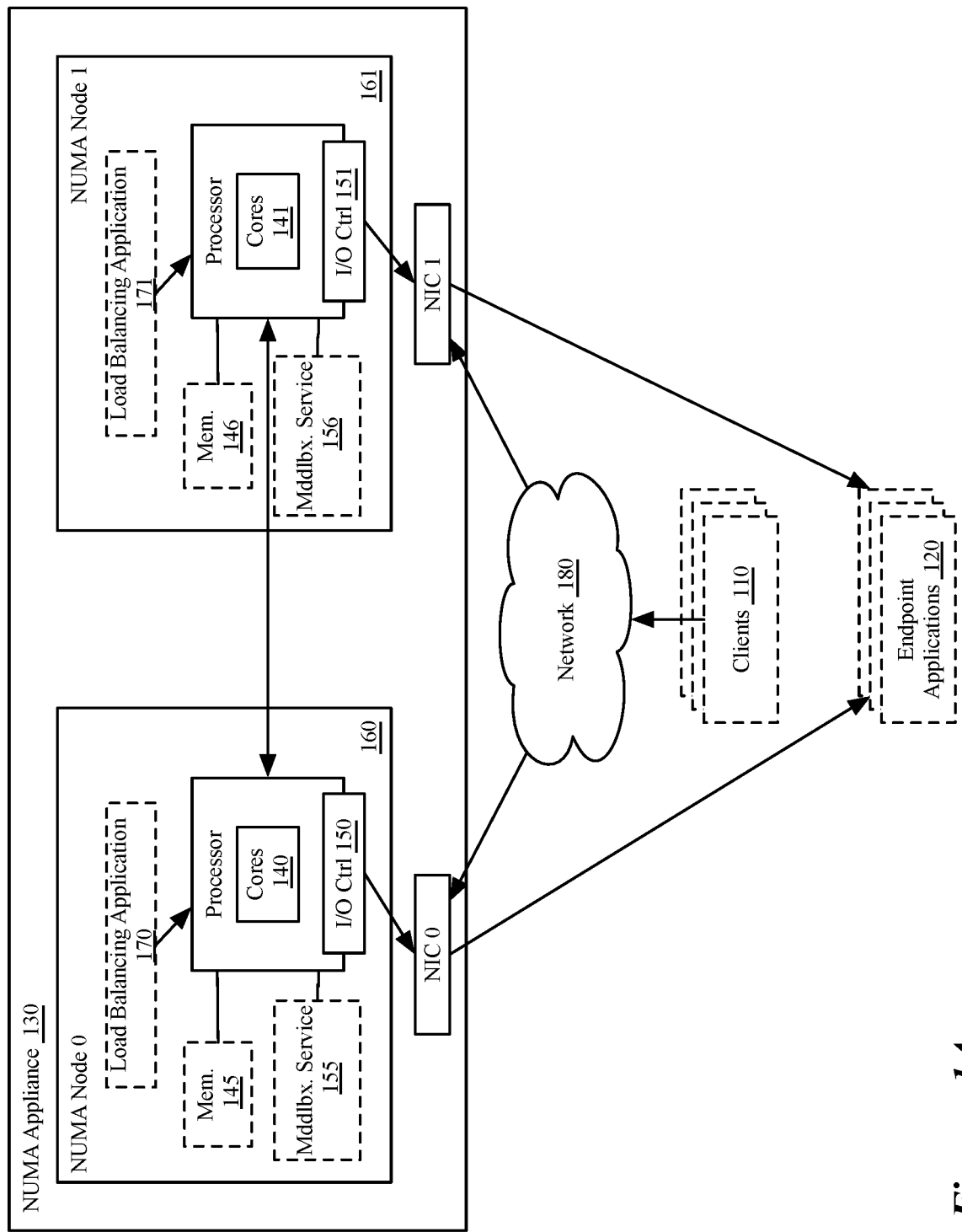
FIGS. 1A-B illustrate an example system for processing data message flows sent from clients to endpoint applications implemented on one or more servers and for assigning the data message flows to different NUMA nodes for processing.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for dynamically processing data message flows using different non-uniform memory access (NUMA) nodes of a processing system. Each NUMA node includes a local memory and a set of processors that can access data other local memories of other NUMA nodes. A load balancing application associated with a first NUMA node receives data message flows destined for an endpoint application. The data message flows are assigned to the first NUMA node to be forwarded to the endpoint application. The load balancing application monitors a central processing (CPU) usage of the first NUMA node to determine whether the CPU usage of the first NUMA node exceeds a particular threshold. When the CPU usage of the first NUMA node exceeds the particular threshold, the load balancing application reassigns at least a subset of the data message flows to the second NUMA node for processing.

In some embodiments, after reassigning at least a subset of data message flows to the second NUMA node, the load balancing application forwards the reassigned data message flows to the second NUMA node for the second NUMA node to be processed. The load balancing application then receives the processed data message flows from the second NUMA node and forwards the processed data message flows to the endpoint application. More specifically, the load balancing application directs the processors of the first NUMA node (1) to provide the reassigned data message flows to the second NUMA node and (2) to forward the processed data message flows to the endpoint application.

In some embodiments, the reassigned data message flows include large data messages such that data message flows including small data messages maintain assignment to the first NUMA node. By reassigning large data messages to be processed by the second NUMA node, the load balancing application relieves load on the first NUMA node. Conjunctively or alternatively, the load balancing application reassigns unencapsulated flows to the second NUMA node, while maintaining assignment of encapsulated flows to the first NUMA node.

The data message flows received at the first NUMA node are in some embodiments initially assigned to the first NUMA node based on quality of service (QOS) parameters (also referred to as QoS requirements, policies, or application heuristics in some embodiments) of the endpoint application. For example, the endpoint application in some embodiments requires a particular latency that the first NUMA node can provide, so the flows of that endpoint application are assigned to be processed by the first NUMA node. In some embodiments, the data message flows are assigned by a network administrator. In other embodiments, the data message flows are assigned by the load balancing application (e.g., using a load balancing algorithm).

The load balancing application is in some embodiments a first instance of a distributed load balancing application implemented by several instances operating on the different NUMA nodes. In some embodiments, each load balancing application instance is associated with a different NUMA node. In other embodiments, each load balancing application instance is associated with a different core of the different NUMA nodes, meaning that each core is associated with its own load balancing application instance.

In some embodiments, after reassigning data message flows to the second NUMA node, the load balancing application stores a record, associating the reassigned data message flows with the second NUMA node, in the local memory of the first NUMA node. In some embodiments, the load balancing application maintains a mapping table that includes each flow and its assigned NUMA node. By maintaining this mapping table, the load balancing application knows which NUMA node is assigned to process each flow. In some embodiments, the record specifies, for each of the reassigned data message flows, a flow identifier (ID) identifying the data message flow and a NUMA node ID identifying the second NUMA node.

The data message flows in some embodiments specify a fully qualified domain name (FQDN), specifying the endpoint application, as a destination of the data message flows. In some of these embodiments, the FQDN specifies a particular endpoint application instance of the endpoint application as the destination of the data message flows. For example, the data message flows in some embodiments specify "ABC.com/A4" as the destination of the flows. The domain name "ABC.com" specifies the endpoint application, and "A4" specifies the particular instance of the endpoint application. By specifying this as the destination, some embodiments can identify the NIC connected to the server hosting the particular instance, which is used to forward the processed flows to the particular instance.

Some embodiments provide a novel method for processing data message flows using several NUMA nodes of a processing system. Each NUMA node includes a local memory and a set of processors that can access data from local memories of other NUMA nodes. A load balancing application associated with a first NUMA node receives a data message flow destined for an endpoint application. The load balancing application determines whether the first NUMA node should perform a middlebox service operation on the data message flow that is destined to the endpoint application. Based on a determination that the first NUMA node should not process the data message flow, the load balancing application directs the data message flow to a second NUMA node for performing the middlebox service operation.

In some embodiments, the load balancing application determines whether the first NUMA node should perform the middlebox service operation based on policies that assign different priority levels to different types of flows. In some of these embodiments, the policies assign a first set of higher priority flow types to the first NUMA node while assigning a second set of lower priority flow types to the second NUMA node. The policies in some embodiments specify latency requirements of different flows, and the first set of higher priority flow types include flows requiring a low latency while the second set of lower priority flow types include flows that do not require a low latency. Conjunctively or alternatively, the policies in some embodiments specify bandwidth requirements of different flows, and the first set of higher priority flow types comprise flows requiring a high bandwidth, while the second set of lower priority flow types comprise flows that do not require a high bandwidth. The policies are received in some embodiments from a set of endpoint applications including the endpoint application to which the received data message flow. By specifying policies, each endpoint application experiences a QoS specific to its needs.

The load balancing application determines whether the first NUMA node should perform the middlebox service operation on the data message flow by determining whether the first NUMA node meets a particular policy of the endpoint application. In some embodiments, the particular policy is a latency policy, such that the load balancing application determines whether the first NUMA node has a latency that meets the latency required by the particular policy. In such embodiments, the load balancing application compares latency metrics of the first NUMA node with the latency policy, and if the latency of the first NUMA node meets the latency policy, the load balancing application determines that the first NUMA node should perform the middlebox service operation on the received flow.

If the load balancing application determines that the latency of the first NUMA node does not meet the latency policy, the load balancing application examines the other NUMA nodes to determine which other NUMA node meets the latency policy. After determining the second NUMA node meets the latency policy (e.g., based on latency metrics collected for the second NUMA node), the load balancing application directs the data message flow to the second NUMA node for performing the middlebox service operation. The middlebox service operation performed on the data message flow may be any middlebox service operation, such as a firewall service, load balancing service, source or destination network address translation service, etc.

In some embodiments, each NUMA node accesses the data from the other local memories using a processor interconnect bridge that connects the set of processors of the NUMA node to another set of processors of another NUMA node. For instance, the first NUMA node in such embodiments provides the data message to the flow to the second NUMA node by using a processer interconnect bridge that connects the processors of the first NUMA node to the processors of the second NUMA node. In some embodiments, the processor interconnect bridge is a QuickPath Interconnect bridge. In other embodiments, the processor interconnect bridge is an Ultra Path Interconnect Bridge.

The second NUMA node performs the middlebox service operation on the data message flow using at least one of (1) data stored at a local memory of the second NUMA node and (2) data stored at a local memory of another NUMA node (e.g., a local memory of the first NUMA node and/or a local memory of a different NUMA node of the processing system). In embodiments where the second NUMA node uses data stored in its own local memory, the second NUMA node's processors directly access the local memory. In embodiments where the second NUMA node uses a local memory of another NUMA node, the second NUMA node's processors access the data through a processor interconnect bridge.

The data message flow is directed to the second NUMA node in some embodiments for processing (e.g., performing the middlebox service operation) and for forwarding the data message flow to the endpoint application. In such embodiments, the first NUMA node does not receive the data message flow back after processing and does not forward the data message flow to its destination (i.e., the endpoint application). In other embodiments, the second NUMA node provides the processed data message flow back to the first NUMA node, which then forwards the data message flow to the endpoint application.

In some embodiments, the load balancing application creates a record associating the data message flow with the second NUMA node. This record indicates that the data message flow is assigned to the second NUMA node for processing (i.e., for performing the middlebox service operation and, in some embodiments, for forwarding to the endpoint application). In some of these embodiments, the load balancing application provides the record to the second NUMA node for the second NUMA node to store in its local memory. Conjunctively, the load balancing application in some embodiments stores the record in each of the NUMA nodes of the processing system, including the first NUMA node.

The record specifies in some embodiments a flow ID identifying the data message flow and a NUMA node ID identifying the second NUMA node. In some embodiments, the flow ID is the five tuple (source network address, destination network address, source port, destination port, protocol) of the data message flow. In some embodiments, the NUMA node ID is a network address (e.g., a media access control (MAC) address, Internet Protocol (IP) address) identifying the NUMA node. In other embodiments, it is a universally unique identifier (UUID) identifying the second NUMA node. Any suitable flow IDs and any suitable NUMA node IDs may be used.

A NUMA appliance is implemented using multiple NUMA nodes in some embodiments in order to use multiple processors and memories. In some embodiments, each NUMA node includes its own local memory and set of processors that can access data other local memories of the other NUMA nodes. In some embodiments, all NUMA nodes execute on a single host computer or appliance. In other embodiments, at least two NUMA nodes execute on different host computers or appliances.

A NUMA node in some embodiments processes data messages using data stored in its local memory and/or data stored in one or more other memories of one or more other NUMA nodes. Using its set of processors, the NUMA node in some embodiments performs a set of one or more operations on a data message flow before forwarding it to its next hop or to its destination. In some embodiments, a NUMA node performs middlebox services (e.g., firewall services, load balancing services, intrusion detection services, intrusion prevention services, etc.) on a data message flow before forwarding the data message. These middlebox services are performed by retrieving data from a local and/or remote memory.

Any application or distributed middlebox service (e.g., distributed firewall service, distributed network address translation service, etc.) can be implemented on a set of NUMA nodes executing on one or more host computers for processing data message flows. If the load on a NUMA node exceeds a threshold (i.e., becomes too high), the distributed application of some embodiments moves one or more processes and/or services to one or more other NUMA nodes in order to alleviate the load. In some embodiments, when the load of the NUMA node reduces, the distributed application moves the one or more processes and/or services back to the NUMA node.

FIG. 1A illustrates an example system for processing data messages sent from a set of one or more clients 110 to one or more endpoint applications 120 implemented on one or more servers. The clients 110 are in some embodiments a set of client applications executing on one or more host computers. In such embodiments, the clients 110 are software (as denoted by dashed lines) executing on physical computers. The system can include any number of clients 110. The endpoint applications 120 can include any number of endpoint applications, each implemented by any number of endpoint application instances executing on any number of servers. In such embodiments, the endpoint applications 120 are software (as denoted by dashed lines) executing on physical servers. In some embodiments, a first endpoint application is implemented on a first set of one or more servers, while a second endpoint applications is implemented on a second set of one or more servers. In other embodiments, a same set of servers implements multiple endpoint applications.

In some embodiments, one endpoint application is a single application of a cluster of applications running on a set of servers. For example, an overall application in some embodiments includes several endpoint applications, such as a billing application, a streaming application, and a user profile application. Each of these endpoint applications can be implemented by multiple instances implemented on multiple servers. In some embodiments, each endpoint application is implemented on its own set of servers. In other embodiments, at least two endpoint applications are implemented on at least a subset of shared servers.

The system in some embodiments includes a NUMA appliance 130 hosting a set of NUMA nodes (also referred to as sockets). In this example, two NUMA nodes 160-161 execute on the NUMA appliance 130, however, a NUMA appliance in other embodiments executes any number of NUMA nodes. The NUMA appliance 130 is in some embodiments is a single host computer or standalone appliance executing a set of NUMA nodes. In other embodiments, different NUMA nodes (e.g., nodes 160-161) execute on different host computers or appliances.

In this example, each NUMA node 160-161 includes a processor with one or more processor cores 140-141, a local memory 145-146, and an input/output (I/O) controller 150-151. The software components of the NUMA nodes 160-161 are denoted by dashed lines, while the hardware components of the NUMA nodes are denoted by solid lines. The memories 145-146 are shared amongst the different nodes, but local accesses (i.e., accesses to memory 145 on the same node as the processor core 140) are fastest, as the access does not need to go across interconnects (e.g., Intel QuickPath Interconnect (QPI), Intel Ultra Path Interconnect (UPI), etc.) between the different nodes. The processor cores 140-

141 are the elements that perform various operations on data stored in the memories 145-146. The I/O controllers 150-151 manage data communications between the nodes and other elements (e.g., NICs, storage, etc.) of the appliance 130.

In some embodiments, the locality of a node with other elements is based on connections between the I/O controller of a node and the element (e.g., a NIC is local to a particular node when the I/O controller of the particular node directly communicates with the NIC). In some embodiments, each NUMA node 160-161 also includes a middlebox service 155-156 that performs one or more middlebox services on data message flows sent from the clients 110 to the endpoint applications 120 through the NUMA appliance 130. In some of these embodiments, the processor and cores 140-141 perform the middlebox services 155-156. The middlebox services 155-156 may be any middlebox services that are performed on data messages, such as a firewall service, load balancing service (e.g., to different instances of a same endpoint application 120), source or destination network address translation service, etc.

NICs 0-1 of some embodiments are physical NICs that connect the appliance 130 to the clients 110 through a network 180. In some embodiments, clients 110 send data message flows, destined for one or more endpoint applications 120, to the network 180 in order to reach the NUMA appliance 130. NICs 0-1 in some embodiments also connect the appliance 130 to the endpoint applications 120. In some embodiments, different NICs connect to different servers executing different endpoint application instances. In other embodiments, different NICs connect to at least one same server. In some embodiments, the NICs connect to a network or a physical switch that directly connects to NICs of other machines in the network. In virtual networking and software defined network, the physical NICs are linked to virtual switches to provide network connectivity between servers. Although this example is shown with two nodes and one NIC per node, one skilled in the art will recognize that the invention is not limited to any particular configuration.

In some embodiments, a NIC (e.g., NIC 0 or NIC 1) that connects to a particular set of servers is connected only to one NUMA node such that all receiving and transmitting flows of the NIC are sent through the connected NUMA node, irrespective of the NUMA node that processes the flows. In such embodiments, a core of the receiving NUMA node may not be the core that is to perform the processing on those flows. Some embodiments refer to the receiving NUMA node as a local NUMA node and refer to the processing NUMA node as a remote NUMA node because the local NUMA node receives the flows and the remote NUMA node processes the flows. In some embodiments, a NUMA node is determined to be the local NUMA node for a flow because it is the NUMA node that first receives the flow. This NUMA node receives the flow first based on any number of deployment parameters, such as (1) assignment of flows by an earlier network element (e.g., a frontend load balancer) based on deterministic or non-deterministic forwarding, (2) domain name system (DNS) resolution by a DNS server cluster, or (3) a configuration set up by a network administrator.

Load balancer applications 170-171 each execute on the NUMA nodes 160-161. In some embodiments, each core 140-141 on each node 160-161 implements a different load balancing application instance (also referred to as a load balancing process). In other embodiments, all cores of a single NUMA node are associated with one load balancing application instance. Still, in other embodiments, one load balancer application is implemented (e.g., as a virtual machine) on the appliance 130. In some embodiments, a load balancing application 170 distributes data message flows sent from the clients 110 to different instances of the endpoint applications 120.

In some embodiments, flows received at a first NUMA node (e.g., node 0) are be processed by the first NUMA node 160 or by a second NUMA node (e.g., NUMA node 161). However, exchanging these flows across an interconnect between the NUMA nodes increases the latency, resulting in a sub-optimal processing overhead. To obviate this issue, some embodiments utilize the load balancer application 170 to dynamically distribute data message flows across different NUMA nodes for processing.

Figure 1B:
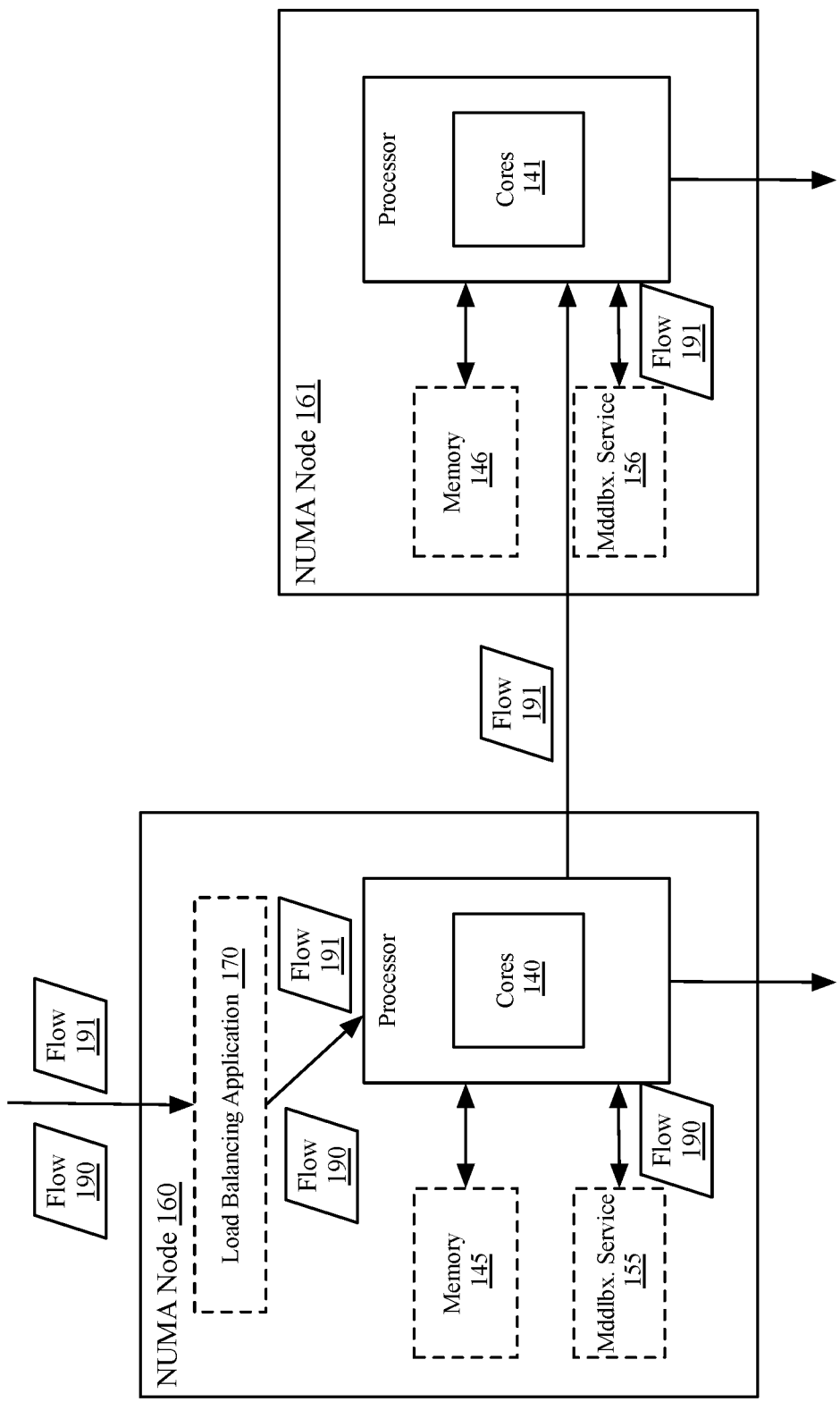

A load balancing application in some embodiments generates initial assignments of flows to NUMA nodes for processing before dynamically distributing flows across different NUMA nodes. FIG. 1B illustrates the load balancing application 170 receiving two flows 190-191 that are to be assigned to the NUMA nodes 160-161 for processing. In some embodiments, these flows 190-191 are new flows, meaning that the load balancing application 170 is receiving the first data messages of these flows 190-191. The flows 190-191 are in some embodiments destined for one or more endpoint applications (such as the endpoint applications 120).

Upon receiving the flows 190-191, the load balancing application determines whether they should be processed by the first NUMA node 160 or the second NUMA node 161. More specifically, the load balancing application 170 determines whether the first NUMA node 160 should perform a middlebox service operation on (i.e., process) the flows 190-191. In some embodiments, the load balancing application 170 determines whether the first NUMA node 160 should perform the middlebox service operation using the processor and cores 140 and the middlebox service 155 based on policies that assign different priority levels to different types of flows. In this example, the first flow 190 is of a first high-priority type, and the second flow 191 is of a second low-priority type. Because of their flow types, the load balancing application 170 assigns the first flow 190 to the first NUMA node 160 and the second flow 191 to the second NUMA node 161.

After this assignment, the load balancing application 170 directs the flow 190 to the processor and cores 140 of the first NUMA node 160 for processing. The first NUMA node 160 performs the middlebox service operation on the data message flow 190 using at least one of (1) data stored at a local memory of the first NUMA node 145 and (2) data stored at a local memory of another NUMA node (e.g., a local memory 146 of the second NUMA node 161). In embodiments where the first NUMA node 160 uses data stored in its own local memory 145, the first NUMA node's processor and cores 140 directly access the local memory 145. In embodiments where the first NUMA node 160 uses the local memory 146 of the second NUMA node 161, the first NUMA node's processor and cores 140 access the data through a processor interconnect bridge connecting the cores 140-141. After processing the flow 190, the processor and cores 140 forward the processed flow to its destination endpoint application.

In some embodiments, the policies specify latency requirements of different flows, and type of the first flow 190 requires a low latency while the type of the second flow 191 does not require a low latency. Conjunctively or alternatively, the policies in some embodiments specify bandwidth requirements of different flows, and the type of the first flow 190 requires a high bandwidth, while the type of the second flow 191 does not require a high bandwidth. These policies are received at the load balancing application 170 in some embodiments from the endpoint application(s) to which the flows 190-191 are destined. In other embodiments, the policies are received from the clients that sent the flows 190-191.

The load balancing application 170 of some embodiments determines whether the first NUMA node 160 should perform middlebox service operations on the flows 190-191 by determining whether the first NUMA node 160 matches a particular policy associated with the flows' types. In some embodiments, the particular policy is a latency policy, such that the load balancing application 170 determines whether the first NUMA node 160 has a latency that matches the latency required by the particular policy. In such embodiments, the load balancing application 170 compares latency metrics of the first NUMA node 160 with the latency policy, and if the latency of the first NUMA node 160 matches the latency policy, the load balancing application 170 determines that the first NUMA node should perform the middlebox service operation on the received flow.

If the load balancing application 170 determines that the latency of the first NUMA node 160 does not match the latency policy, the load balancing application 170 examines the other NUMA nodes (i.e., NUMA node 161) to determine which other NUMA node of the appliance matches the latency policy. After determining the second NUMA node match the latency policy (e.g., based on latency metrics collected for the second NUMA node 161), the load balancing application 170 directs the data message flow 191 to the second NUMA node 161 for performing the middlebox service operation using the processor and cores 141 and the middlebox service 156. The middlebox service operation performed on the data message flow may be any middlebox service operation, such as a firewall service, load balancing service, source or destination network address translation service, etc.

The second NUMA node 161 performs the middlebox service operation on the data message flow 191 using at least one of (1) data stored at a local memory of the second NUMA node 146 and (2) data stored at a local memory of another NUMA node (e.g., a local memory 145 of the first NUMA node 160). In embodiments where the second NUMA node 161 uses data stored in its own local memory 146, the second NUMA node's processor and cores 141 directly access the local memory 146. In embodiments where the second NUMA node 161 uses the local memory 145 of the first NUMA node 160, the second NUMA node's processor and cores 141 access the data through a processor interconnect bridge connecting the cores 140-141.

The data message flow 191 is directed to the second NUMA node 161 in some embodiments for processing (e.g., performing the middlebox service 156) and for forwarding the data message flow 191 to its destination endpoint application. In such embodiments, the first NUMA node 160 does not receive the data message flow 191 back after processing and does not forward the data message flow 191 to its destination (i.e., the endpoint application). In other embodiments, the second NUMA node 161 provides the processed data message flow 191 back to the first NUMA node 160, which then forwards the data message flow 190 to the endpoint application.

In some embodiments, the load balancing application 170 creates a first record associating the flow 190 with the first NUMA node 160 and a second record associating the flow 191 with the second NUMA node 161. Each record indicates which NUMA node is assigned to process (i.e., for performing the middlebox service operation and, in some embodiments, for forwarding to the endpoint application) the data message flow specified in the record. In some of these embodiments, the load balancing application 170 provides the records to the memories 145-146 for storing so the NUMA nodes 160-161 are able to know which flows they received they are to process.

Each record specifies in some embodiments a flow ID identifying a data message flow and a NUMA node ID identifying the NUMA node assigned to process the flow. In some embodiments, the flow ID is the five tuple (source network address, destination network address, source port, destination port, protocol) of the data message flow. In some embodiments, the NUMA node ID is a network address (e.g., a MAC address, IP address) identifying the NUMA node. In other embodiments, it is a UUID identifying the NUMA node. Any suitable flow IDs and any suitable NUMA node IDs may be used.

Figure 2:
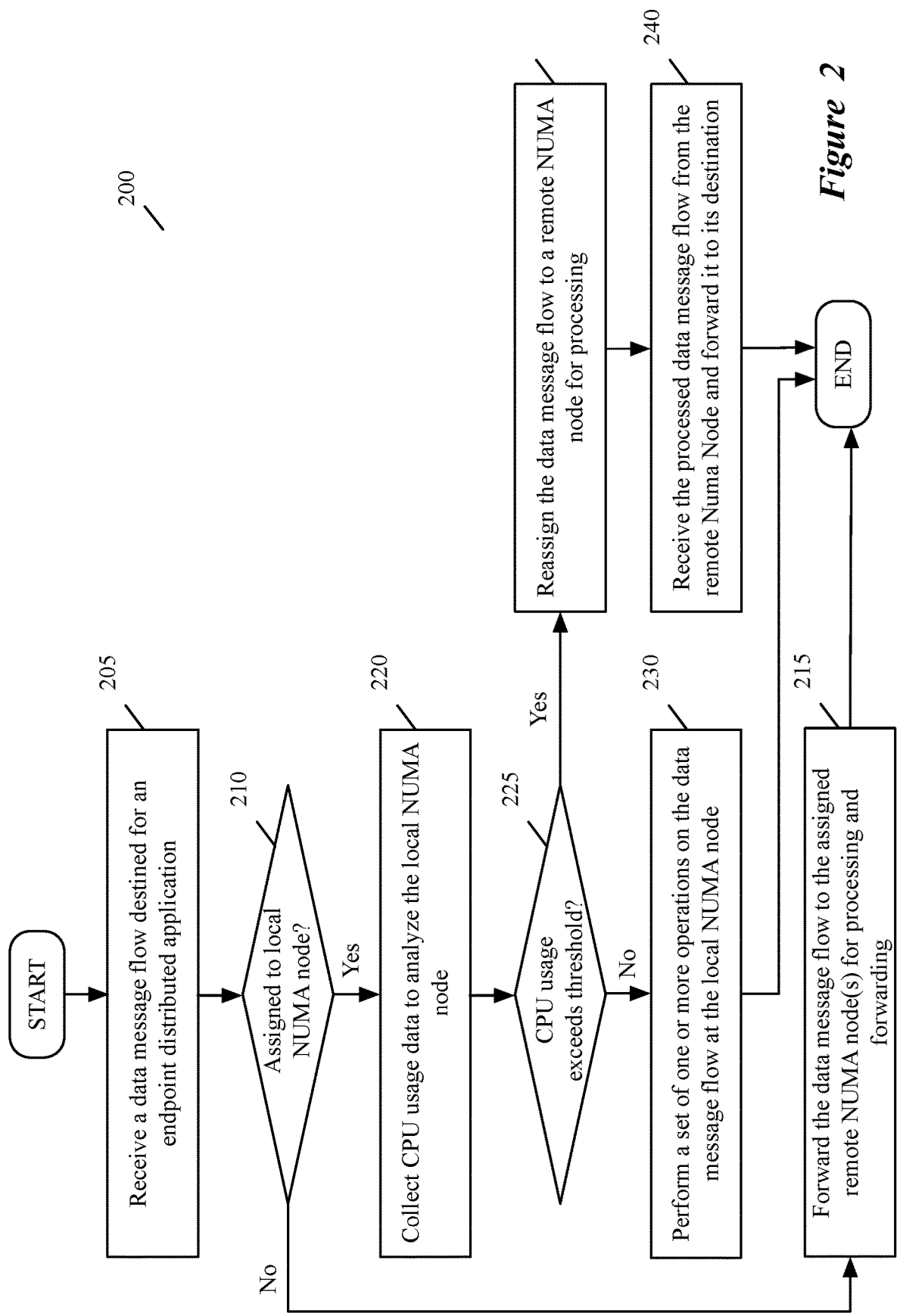
FIG. 2 conceptually illustrates a process of some embodiments for dynamically processing data message flows using different NUMA nodes of a processing system.

As discussed previously, a load balancing application in some embodiments dynamically distributes data message flows among different NUMA nodes for processing. FIG. 2 conceptually illustrates a process 200 of some embodiments for dynamically processing data message flows using different NUMA nodes of a processing system. The process 200 is performed in some embodiments by a load balancing application associated with (e.g., executing on) a first NUMA node, which will be referred to as a local NUMA node. In some embodiments, each NUMA node includes its own local memory and a set of processors that can access data other local memories of the other NUMA nodes. In some embodiments, all NUMA nodes execute on a single host computer or appliance. In other embodiments, at least two NUMA nodes execute on different host computers or appliances. Data message flows are in some embodiments sent to the NUMA nodes from a set of one or more clients and are destined to a set of one or more servers hosting one or more endpoint applications.

In some embodiments, the first NUMA node is determined to be the local NUMA node for one or more data message flows because it is the NUMA node that first receives the flows. The first NUMA node receives the flows first based on any number of deployment parameters, such as (1) assignment of flows by an earlier network element (e.g., a frontend load balancer) based on deterministic or non-deterministic forwarding, (2) DNS resolution by a DNS server cluster, or (3) a configuration set up by a network administrator.

The process 200 begins by receiving (at 205) a data message flow destined for an endpoint application. The load balancing application in some embodiments receives, from a particular client, a data message flow that is to be forwarded to a particular endpoint application executing on one or more servers. The flow in some embodiments specifies a virtual Internet Protocol (VIP) address of the endpoint application as the destination of the flow. In other embodiments, the flow specifies an FQDN associated with the endpoint application. For example, a flow in some embodiments specifies "ABC.com/A1" as the destination of the flow, where "ABC.com" is the domain name for the endpoint application and "A1" specifies the particular instance to which it is destined.

Next, the process 200 determines (at 210) whether the received data message flow is assigned to the local NUMA node. The flow is in some embodiments assigned to a NUMA node for processing before being forwarded to its destination. In some embodiments, a flow is assigned to a NUMA node based on QoS parameters of the endpoint application to which it is destined. For example, a flow of a first endpoint application in some embodiments is assigned to the local NUMA node because the first endpoint application requires a particular latency that the local NUMA node can provide, while a flow of a second endpoint application is assigned to a remote NUMA node because the second endpoint application does not require a particular latency and the flow has a high bandwidth. High bandwidth or long-lived flows in some embodiments are assigned to remote NUMA nodes because they can tolerate high latency. In other embodiments, flows are assigned to different NUMA nodes based on characteristics of the flows. For example, a large flow (i.e., a flow that includes a large number of data messages) is in some embodiments assigned to the local NUMA node, while a small flow (i.e., a flow that includes a small number of data messages) is assigned to a remote NUMA node.

In some embodiments, flows are initially assigned to different NUMA nodes based on policies defined by a network administrator. In other embodiments, they are assigned based on a load balancing algorithm performed by the load balancing application. Any load balancing algorithm may be used by the load balancing application to initially assign flows to NUMA nodes. In some embodiments, flow and NUMA node assignments are recorded in a mapping table stored in the local memory of the local NUMA node. These mappings in some embodiments map a flow identifier (ID) of the flow (e.g., a five tuple or a hash of header values of the data messages in the flow) that uniquely identifies the flow to a NUMA node ID of the assigned NUMA node that uniquely identifies the NUMA node.

In some embodiments, the load balancing application determines whether the received flow is assigned to the local NUMA node by performing a lookup in the mapping table stored in the local memory of the local NUMA node. The lookup is performed in some embodiments by matching a flow ID of the received flow to a flow ID recorded in the mapping table. Then, the load balancing application determines the associated NUMA node for the flow by determining a NUMA node ID associated with the flow ID. In some embodiments, all flows associated with one endpoint application are associated with a same NUMA node. In other embodiments, at least two flows of a single endpoint application are associated with at least two different NUMA nodes.

If the process 200 determines that the data message flow is not assigned to the local NUMA node, the process 200 forwards (at 215) the data message flow to the assigned remote NUMA node(s) for processing and forwarding. After receiving the flow, the assigned remote NUMA node in some embodiments processes the flow by performing a set of one or more operations on the flow before forwarding the flow to the destined endpoint application. In some of these embodiments, the assigned NUMA node performs one or more middlebox services (e.g., firewall services, load balancing services, intrusion detection services, etc.) on the flow. After forwarding the flow to the assigned remote NUMA node or nodes for processing and forwarding, the process 200 ends.

If the process 200 determines that the data message flow is assigned to the local NUMA node, the process 200 collects (at 220) CPU usage data to analyze the local NUMA node. In some embodiments, the local NUMA node is provisioned a particular level of CPU usage in order to avoid over-utilization of the local NUMA node's CPU. The provisioned level of CPU usage is in some embodiments determined by a network administrator. By collecting CPU usage data related to the local NUMA node, the load balancing application is able to monitor the CPU usage of the local NUMA node.

At 225, the process 200 determines whether the CPU usage of the local NUMA node exceeds a particular threshold. The load balancing application in some embodiments analyzes the collected CPU usage data (e.g., CPU utilization metrics) of the local NUMA node to determine whether the local NUMA node is exceeding the particular threshold. In some embodiments, the threshold is specified by a network administrator. If the process 200 determines that the CPU usage of the local NUMA node does not exceed the threshold, the process 200 performs (at 230) a set of one or more operations on the data message flow at the local NUMA node. The load balancing application, in determining that the CPU usage of the local NUMA node does not exceed the threshold, maintains the assignment of the flow to the local NUMA node, and processes the flow on the local NUMA node (e.g., by performing one or more middlebox services) and forwards it to its destination endpoint application. After performing the set of operations on the flow, the process 200 ends.

If the process 200 determines that the CPU usage of the local NUMA node does exceed the threshold, the process 200 reassigns (at 235) the data message flow to a remote NUMA node for processing. When the load balancing application determines that the CPU usage of the local NUMA node is higher than the threshold, the load balancing application reassigns the received flow to a remote NUMA node for processing. In some embodiments, the remote NUMA node is selected from a set of two or more remote NUMA nodes to receive the flow. In some of these embodiments, the load balancing application selects the remote NUMA node based on CPU usage of the remote NUMA nodes (e.g., the load balancing application selects the remote NUMA node with the lowest CPU usage).

After reassigning the flow to the remote NUMA node, the process 200 receives (at 240) the processed data message flow from the remote NUMA node and forwards the processed data message flow to its destination (i.e., the endpoint application). In some embodiments, the local NUMA node still forwards the flow to its destination even though a remote NUMA node processed it. In such embodiments, the remote NUMA node forwards the processed flow back to the local NUMA node to be forwarded to the endpoint application. After forwarding the processed flow to its destination, the process 200 ends.

While the process 200 is described using embodiments that receive the processed flow back at the local NUMA node after a remote NUMA node processed it, in other embodiments, the remote NUMA node forwards the processed flow itself to the destination endpoint application. In such embodiments, the local NUMA node does not receive the processed flow back after forwarding the flow to the remote NUMA node.

The process 200 is described above in relation to monitoring CPU usage data of a local NUMA node to determine when to process flows at a remote NUMA node. However, one of ordinary skill would understand that the process 200 is implemented different in other embodiments. For instance, the local NUMA node is conjunctively or alternatively monitored using other metrics of a local NUMA node. Such examples of metrics include memory metrics, storage metrics, general processing unit (GPU) metrics, bandwidth metrics, latency metrics, etc.

In some embodiments, the steps 220-225 of the process 200 are performed periodically (e.g., every five seconds) for a number of flows to determine when flows need to be reassigned from the local NUMA node to one or more remote NUMA nodes, rather than performing the steps 220-225 for each flow received at the local NUMA node. The load balancing application in some embodiments, after determining that one or more flows should be reassigned to one or more remote NUMA nodes, determines which classes of flows should be reassigned. In some embodiments, the load balancing application reassigns all flows to one or more remote nodes, and does not maintain assignment of any flows to the local NUMA node.

In other embodiments, the load balancing application reassigns flows that include large data messages to one or more remote NUMA nodes, and maintains assignment of flows that include small data messages to the local NUMA node. The load balancing application of some embodiments determines which data messages are small and large by determining the number of bytes of each data message. If the number of bytes of a data message is below a particular amount (e.g., which is specified by a network administrator), the data message is classified as a small data message. If the number of bytes of a data message is above the particular amount, the data message is classified as a large data message.

Still, in other embodiments, the load balancing application reassigns unencapsulated flows to one or more remote NUMA nodes, and maintains assignment of encapsulated flows to the local NUMA node. In some embodiments, the load balancing application performs the reassignment of flows to NUMA nodes by updating the mapping table in the local memory to reflect the new assignments.

Figure 3:
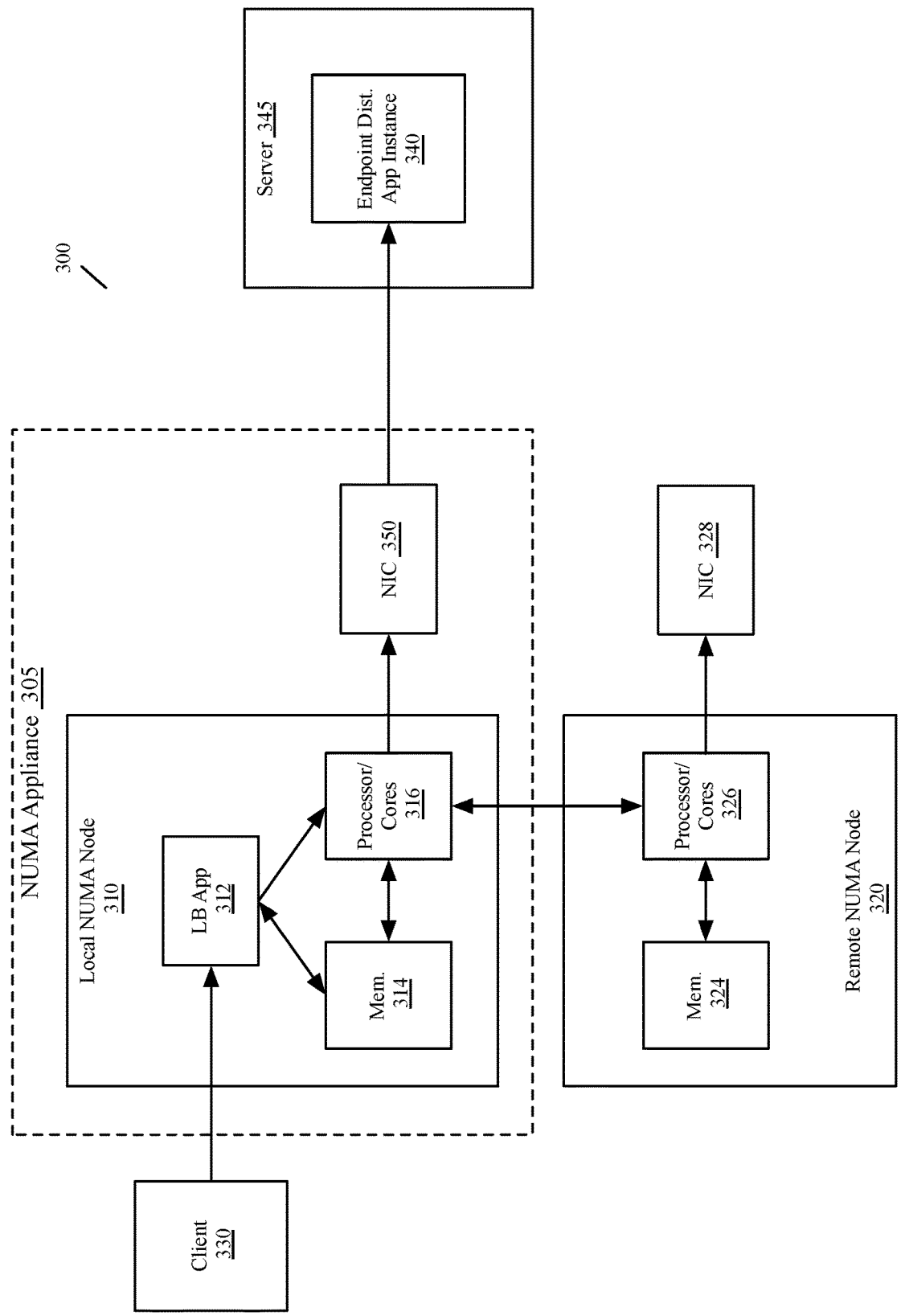
FIG. 3 illustrates an example system for dynamically assigning flows to a local NUMA node and a remote NUMA node based on CPU usage of the local NUMA node.

FIG. 3 illustrates an example system 300 for dynamically assigning processing of flows to a local NUMA node 310 and a remote NUMA node 320 based on CPU usage of the local NUMA node 310. In this example, one remote NUMA node 320 is used for processing flows, however, in other embodiments, multiple remote NUMA nodes are used along with the local NUMA node 310. The local node 310 executes on a NUMA appliance 305. In some embodiments, the remote node 320 also executes on this appliance 305. In other embodiments, it resides on another NUMA appliance.

The system 300 includes a client 330 that initiates flows to the local NUMA node 310 to be forwarded to an endpoint distributed application instance 340 executing on a server 345. The local node 310 is designated as the local node in this system 300 because it is associated with the NIC 350, executing on the NUMA appliance 305, connected to the destination server 345.

The load balancing application 312 of the local node 310 receives the flows. Upon receiving a flow, the load balancing application 312 performs a lookup in a mapping table stored in the local node's memory 314 to determine whether the local node 310 or the remote node 320 is assigned to process it. For example, the load balancing application 312 uses the flow's ID to determine an associated NUMA node ID corresponding to the node assigned for processing.

If the load balancing application 312 determines that the local node 310 is assigned to process the flow, it passes the flow to the processor and cores 316 of the local node 316. The processor and cores 316 use the local memory 314 to process the flow (e.g., by performing one or more middlebox services), and forward it through the NIC 350 connected to the local node 310 in order to forward it to the destination endpoint distributed application instance 340.

If the load balancing application 312 determines that the remote node 320 is assigned to process the flow, it directs the processor and cores 316 to pass the flow to the remote node's processor and cores 326 for processing (e.g., through a QPI or UPI interconnecting bridge). After receiving the flow, the processor and cores 326 of the remote node 320 processes the flow using its local memory 324, passes the processed flow back to the processor and cores 316 to be forwarded through the NIC 350 to the destination endpoint distributed application instance 340. The remote node 320 of some embodiments is associated with another NIC 328. In some embodiments, the NIC 328 is also connected to the server 345. In such embodiments, the remote node 320 can instead forward the processed flow directly to the endpoint distributed application instance 340 through the NIC 328. In other embodiments, the NIC 328 is not associated with the server 345, so the remote node 320 sends the processed flow back to the local node 310.

In some embodiments, the load balancing application 312 monitors the CPU usage of the local node 310 and dynamically reassigns flows to the local node 310 and the remote node 320 when the local node's CPU usage exceeds a predefined threshold. For example, for a flow initially assigned to the local node 310, the load balancing application 312 of some embodiments monitors the local node's CPU usage, determines that it exceeds a particular threshold, and reassigns the flow to the remote node 320. As another example, the client 330 in some embodiments sends a new flow to the local node 310, the load balancing application 310 of some embodiments determines that the current CPU usage of the local node 310 exceeds the threshold, and assigns the new flow to the remote node 320 in order to avoid CPU over-utilization of the local node.

In some embodiments, the load balancing application 310 periodically monitors the local node's CPU usage, and upon determining that the CPU usage has fallen below a certain threshold (e.g., below a second threshold), will reassign one or more flows back to the local node 310, after assigning them to the remote node 320 in order to reduce the CPU usage of the local node 310. In some embodiments, the load balancing application 312 reassigns flows to the remote node 320 after determining that a predicted (e.g., heuristic) future CPU usage of the local node will exceed a threshold. This determination is made in some embodiments using collected CPU usage metrics of the local node 310 and performing calculations to determine a future predicted CPU usage.

While the remote node 320 is not illustrated in this figure to include a load balancing application or to be connected to a NIC or a server hosting endpoint distributed application instances, the remote node 320 in other embodiments connects to one or more other servers hosting one or more endpoint distributed application instances through one or more NICs, and the remote node 320 also includes a load balancing application to dynamically assign flows to the remote node 320, the local node 310, and/or other NUMA nodes.

Figure 4:
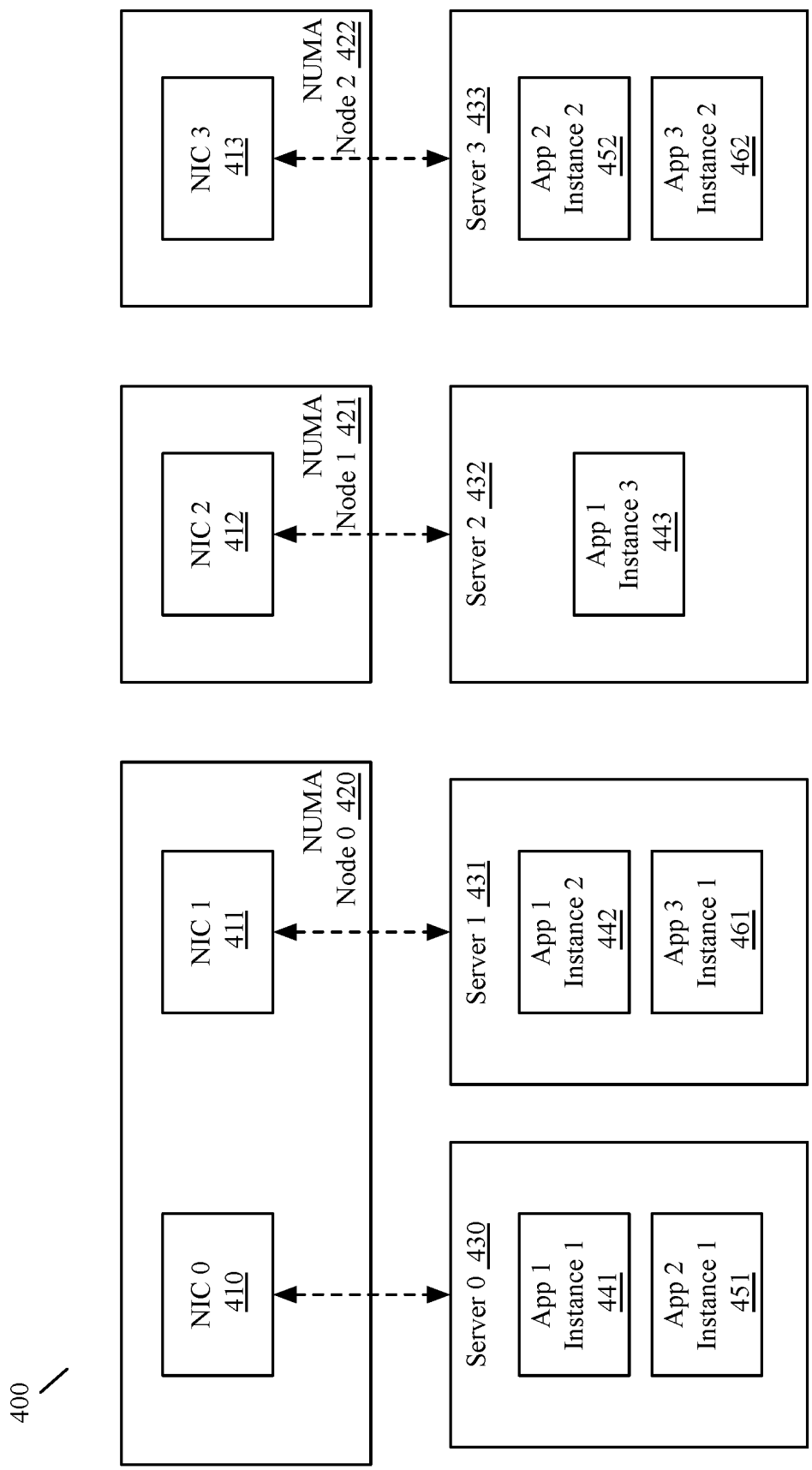
FIG. 4 illustrates an example system that connects different NICs of different NUMA nodes to different instances of endpoint distributed applications.

In some embodiments, different NICs of a set of NUMA nodes are connect to different application instances of a same application. FIG. 4 illustrates an example system 400 that includes different NICs associated with different servers. In this figure, NICs 410-413 connected to different NUMA nodes 420-422 are associated with a set of servers 430-433. In some embodiments, the NUMA nodes 420-422 execute on a same NUMA appliance. In other embodiments, at least two of the NUMA nodes 420-422 execute on different NUMA appliances.

In this figure, each NIC 410-413 is associated with a different server 430-433. While each NIC is associated with only one server in this example, in other embodiments, at least one NIC is associated with two or more servers. NIC 410, which is connected to NUMA node 420, is associated with server 430. NIC 411, which is also connected to NUMA node 420, is associated with server 431. NIC 412, which is connected to NUMA node 421, is associated with server 432. NIC 413, which is connected to NUMA node 422, is associated with server 433.

Server 430 implements a first endpoint distributed application's first instance 441 and a second endpoint distributed application's first instance 451. Server 431 implements the first endpoint distributed application's second instance 442 and a third endpoint distributed application's first instance 461. Server 432 implements the first endpoint distributed application's third instance 443. Server 433 implements the second endpoint distributed application's second instance 452 and the third endpoint distributed application's second instance 462.

In some embodiments, because different instances of one endpoint distributed application are associated with different NICs (and, in some embodiments, different NUMA nodes), NUMA nodes initially assigned to flows are referred to as local NUMA nodes of the flows. In some embodiments, a NUMA node is determined to be the local NUMA node for a flow because it is the NUMA node that first receives the flow. This NUMA node receives the flow first based on any number of deployment parameters, such as (1) assignment of flows by an earlier network element (e.g., a frontend load balancer) based on deterministic or non-deterministic forwarding, (2) DNS resolution by a DNS server cluster, or (3) a configuration set up by a network administrator.

For example, a flow destined for the first endpoint distributed application is in some embodiments first received at NIC 410 of NUMA node 420. Because of this, NUMA node 420 is referred to as the local NUMA node for the flow. In some embodiments, only NUMA node 421 is referred to as a remote NUMA node for this flow, as NUMA node 422 does not connect to a server hosting any instances of the first endpoint distributed application. In other embodiments, both NUMA nodes 421 and 422 are referred to as remote NUMA nodes for the flow.

Figure 5:
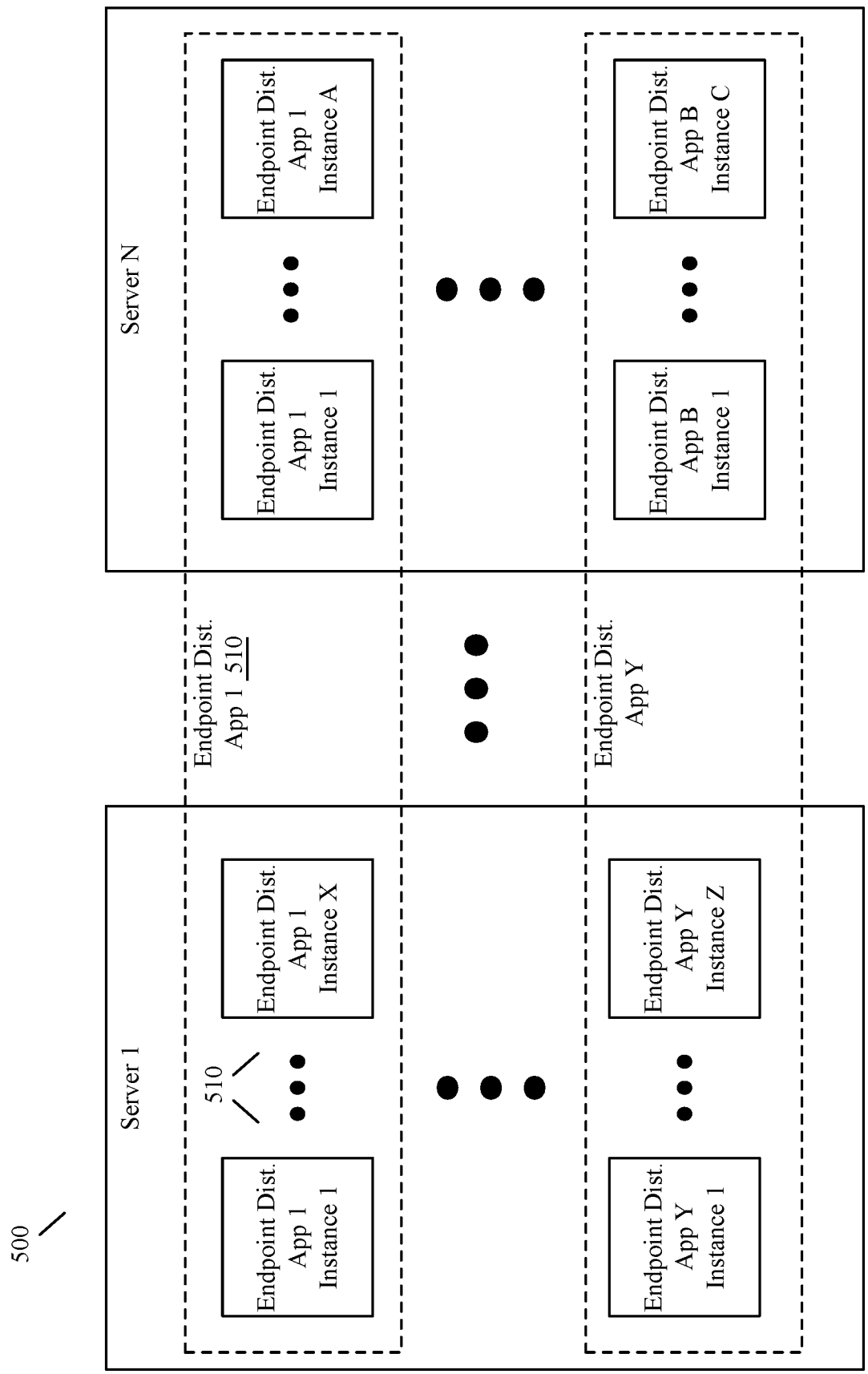
FIG. 5 illustrates an example set of servers that implement different instances of different endpoint distributed applications.

As discussed previously, a server in some embodiments implements one or more endpoint distributed application instances for one or more different endpoint distributed applications. FIG. 5 illustrates an example set of servers 500 that implement different instances of different endpoint distributed applications. The server set 500 can include any number of servers. Each server includes a set of one or more endpoint distributed applications implemented by one or more endpoint distributed application instances. In some embodiments, each server 500 includes only one instance per endpoint distributed application implemented on the server. In other embodiments, each server 500 can include one or more instances per endpoint distributed applications implemented on the server.

In some embodiments, each server 500 implements a same set of endpoint distributed applications. For example, each of a set of three servers in some embodiments implement two endpoint distributed applications, where each endpoint distributed application has one instance executing on each server. In other embodiments, at least two servers in the set 500 implement different endpoint distributed applications. For example, (1) a first server in a server set in some embodiments implements instances for first and second endpoint distributed applications, (2) a second server in the server set implements instances for the first endpoint distributed application and a third endpoint distributed application, and (3) a third server in the server set implements instances for the second and third endpoint distributed applications.

In this example, a first endpoint distributed application 510 is implemented on the set of servers 500. Each server 500 implementing the endpoint distributed application 510 includes a set of one or more instances 520 for the application 510. In some embodiments, each server implementing the application 510 includes a same number of instances 510. In other embodiments, different servers implement different numbers of instances 520 of the application 510.

Figure 6:
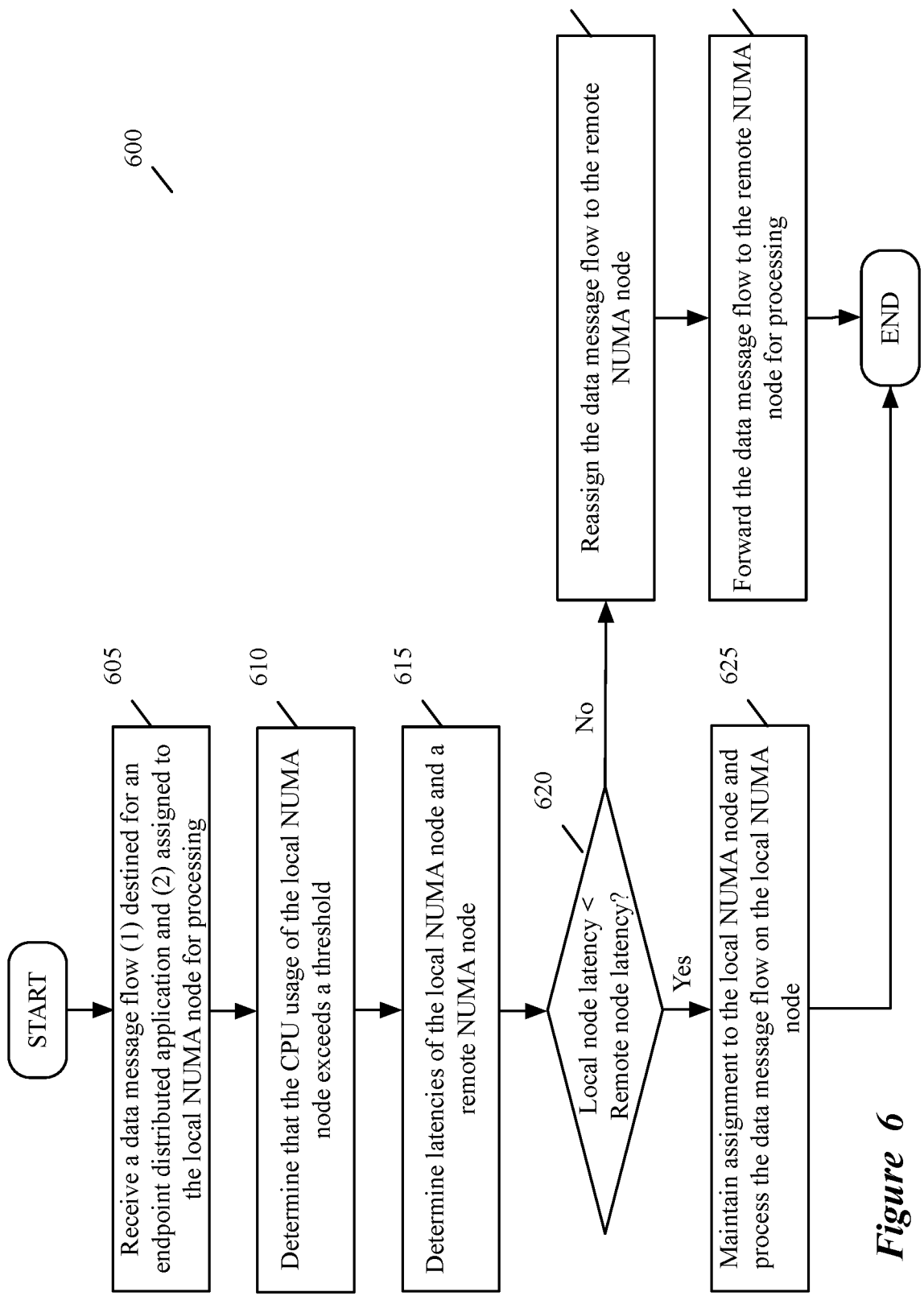
FIG. 6 conceptually illustrates a process of some embodiments for dynamically assigning flows to different NUMA nodes based on latency measurements of the different NUMA nodes.

As discussed previously, some embodiments, dynamically assign different flows to different NUMA nodes based on monitored CPU usage of a local NUMA node. In some embodiments, flows are dynamically assigned to different NUMA nodes also based on latency measurements of the NUMA nodes. FIG. 6 conceptually illustrates a process 600 of some embodiments for dynamically assigning flows to different NUMA nodes based on latency measurements of the different NUMA nodes. The process 600 is performed in some embodiments by a load balancing application associated with a local NUMA node (e.g., executing on the local NUMA node).

The process 600 begins by receiving (at 605) a data message flow that is (1) destined for an endpoint distributed application and (2) assigned to the local NUMA node for processing. The load balancing application in some embodiments receives, from a particular client, a data message flow that is to be forwarded to a particular endpoint distributed application executing on one or more servers. In some embodiments, the flow is to be forwarded to one or more instances of the endpoint distributed application implemented on one or more servers connected to the local NUMA node.

The load balancing application in some embodiments, after receiving the flow, determines that the flow is assigned to be processed at the local NUMA node by performing a lookup in a mapping table to determine the NUMA node to which the flow is assigned. In these embodiments, the flow is assigned to the local NUMA node.

Next, the process 600 determines (at 610) that the CPU usage of the local NUMA node exceeds a threshold. In some embodiments, the local NUMA node is provisioned a particular level of CPU usage in order to avoid over-utilization of the local NUMA node's CPU. The provisioned level of CPU usage is in some embodiments determined by a network administrator. The load balancing application in some embodiments analyzes CPU utilization metrics of the local NUMA node and determines that the local NUMA node is exceeding the threshold.

In other embodiments, instead of determining CPU usage of the local NUMA node, the load balancing application analyze other metrics, such as memory metrics, storage metrics, GPU metrics, bandwidth metrics, etc. Using one or more of these metric types, the load balancing application in these embodiments determines when to reassign one or more flows from the local NUMA node to one or more remote NUMA nodes.

After determining that the CPU usage of the local NUMA node exceeds the threshold, the process 600 determines (at 615) latencies of the local NUMA node and a remote NUMA node. In some embodiments, the load balancing application sends heartbeat messages to the local and remote NUMA nodes to determine the latency of each node. In other embodiments, the load balancing application uses latency metrics already collected and stored for each NUMA node. While only one remote NUMA node is considered in these embodiments, other embodiments determine latencies for two or more remote NUMA nodes.

At 620, the process 600 determines whether the local NUMA node's latency is less than the remote NUMA node's latency. The load balancing application of some embodiments analyzes the latency measurements of the two NUMA nodes to determine whether the local NUMA node has a lower or higher latency. If the process 600 determines that the local NUMA node has a lower latency (i.e., that the local NUMA node processes flows faster than the remote NUMA node), the process 600 maintains (at 625) the assignment of the data message flow to the local NUMA node and processes the data message flow on the local NUMA node. Because the load balancing application determines (using the latency measurements) that the local NUMA node processes flows faster than the remote NUMA node, the load balancing application maintains the assignment of the flow to the local NUMA node. Then, the flow is processed on the local NUMA node to be forwarded to the destination endpoint distributed application (i.e., to the destination instance of the destination endpoint distributed application). After processing the flow, the process 600 ends.

If the process 600 determines that the local NUMA node does not have a lower latency (i.e., that the local NUMA node processes flows slower than the remote NUMA node), the process 600 reassigns (at 630) the data message flow to the remote NUMA node. After determining that the remote NUMA node will process the flow faster than the local NUMA node (because it has a lower latency than the local NUMA node), the load balancing application reassigns the flow to the remote NUMA node. In some embodiments, the load balancing application updates a mapping in the mapping table stored at the local NUMA node to map the flow to the remote NUMA node.

Lastly, the process 600 forwards (at 635) the data message flow to the remote NUMA node for processing. In some embodiments, the load balancing application provides the flow to the processor and cores of the local NUMA node, which provides the flow to the processor and cores of the remote NUMA node (e.g., using a processor interconnect). After the data message flow has been processed, the process 600 ends.

In some embodiments, in addition to considering latency to assign flows to NUMA nodes, some embodiments also consider loss percentage of servers hosting the destination endpoint distributed applications. For example, the load balancing application of some embodiments determines that the latencies of the local and remote NUMA nodes are the same, but the loss percentage of the server hosting the destination endpoint distributed application instance is greater than zero. In such embodiments, the load balancing application maintains assignment of one or more flows to the local node in order to avoid further loss. As another example, the load balancing application of some embodiments determines that the latencies of the local and remote NUMA nodes are the same, and there is a zero loss percentage for the server hosting the destination endpoint distributed application instance. In such embodiments, the load balancing application reassigns one or more flows to the remote node. An example of a loss percentage formula is:

$$\text{loss percentage} = (L/C)*100 \tag{1}$$

where L is the amount lost, and C is the total cost.

Figure 7:
FIG. 7 illustrates a table specifying different latencies for a local NUMA node and a remote NUMA node and loss percentages of multiple servers.

FIG. 7 illustrates an example table 700 specifying different latencies across a local NUMA node 710 and a remote NUMA node 720, and the loss percentage of each of multiple servers. In this example, each server is associated with a latency for each NUMA node 710 and 720 and a loss percentage. Server 1 has a latency of 10 ms (milliseconds) for the local NUMA node 710, a latency of 12 ms for the remote NUMA node 720, and a loss percentage of 10%. In some embodiments, because the latencies are comparable (i.e., similar) and because the server has a loss percentage above zero, a load balancing application will use the local NUMA node 710 for processing flows.

Server 2 has a latency of 5 ms for the local NUMA node 710, a latency of 6 ms for the remote NUMA node 720, and a loss percentage of 0%. In some embodiments, because the latencies are comparable (i.e., similar) and because the server has a loss percentage of zero, a load balancing application will use the remote NUMA node 720 for processing flows.

Server 3 has a latency of 2 ms for the local NUMA node 710, a latency of 2.5 ms for the remote NUMA node 720, and a loss percentage of 5%. In some embodiments, because the latencies are comparable (i.e., similar) and because the server has a loss percentage above zero, a load balancing application will use the local NUMA node 710 for processing flows. In other embodiments, the load balancing application uses the remote NUMA node 720 because the loss percentage may increase with the load.

Server 4 has a latency of 2 ms for the local NUMA node 710, a latency of 4.2 ms for the remote NUMA node 720, and a loss percentage of 0%. In some embodiments, because the latency of the local NUMA node 710 is much less than the latency of the remote NUMA node 720, and because the server has a loss percentage of zero, a load balancing application will use the local NUMA node 710 for processing flows.

Figure 8:
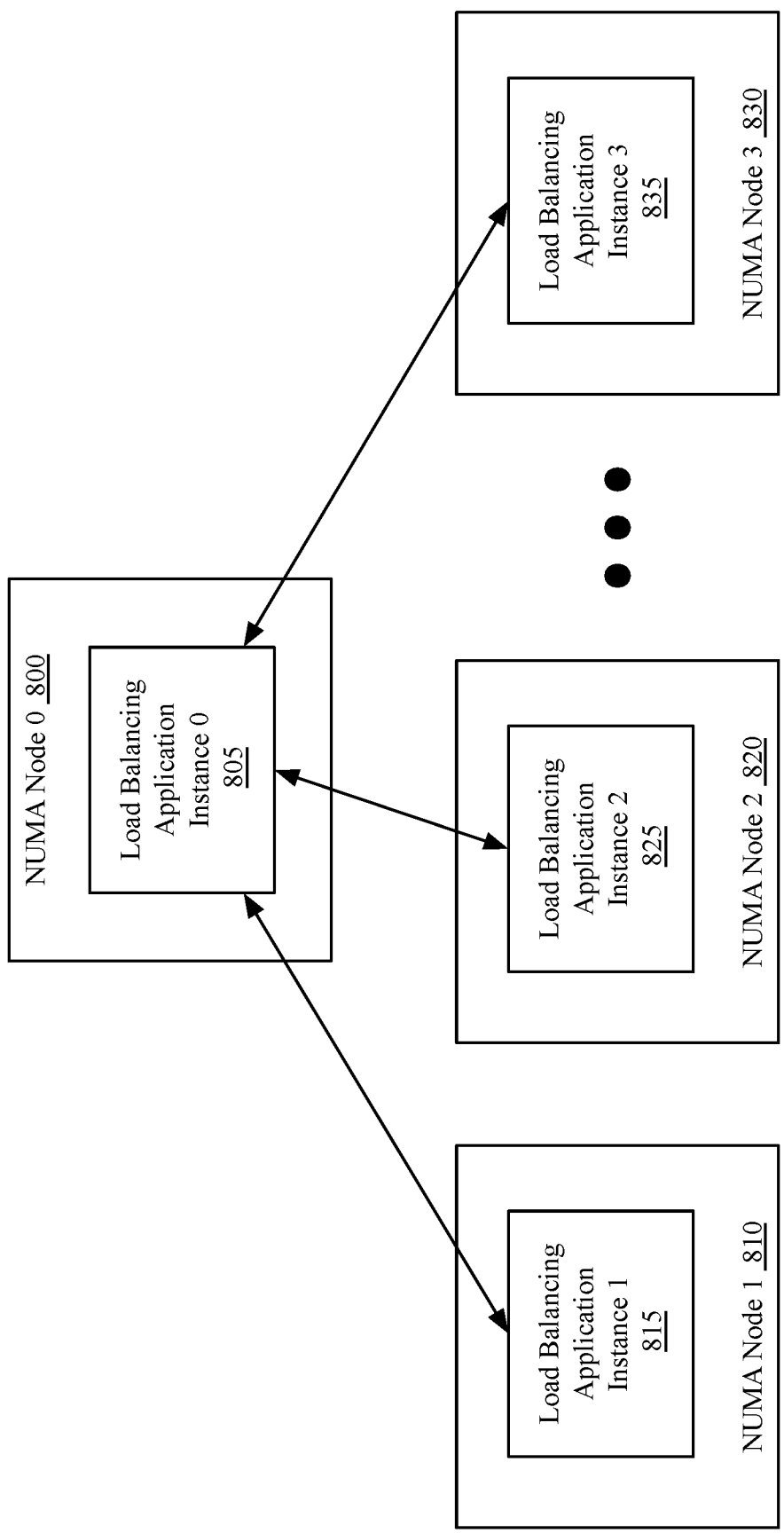
FIG. 8 illustrates an example set of NUMA nodes hosting several load balancing application instances of a distributed load balancing application that distributed flow to NUMA node assignments along the different instances.

As discussed previously, a load balancing application in some embodiments updates assignments of flows to NUMA nodes and stores the assignments in a local memory. In some embodiments, different load balancing applications (e.g., different load balancing application instances) executing on different NUMA nodes of a same processing system share these flow to NUMA node assignments. FIG. 8 illustrates an example set of NUMA nodes 800-830 hosting several load balancing application instances of a distributed load balancing application that distributes flow to NUMA node assignments among the different load balancing application instances. A set of NUMA nodes can include any number of NUMA nodes.

In some embodiments, a first NUMA node 800 is designated as a primary NUMA node, and the first load balancing application instance 805 is designated as the primary load balancing application instance. In such embodiments, all other NUMA nodes 810-830 are designated as secondary NUMA nodes, and their load balancing application instances 815, 825, and 835 are designated as secondary load balancing application instances. The secondary load balancing application instances 815, 825, and 835 in some embodiments provide flow to NUMA node assignments they created and/or updated to the primary load balancing application instance 805. In some embodiments, these assignments are provided periodically. In other embodiments, they are provided any time a new assignment is created or an assignment is updated by a load balancing application instance.

After receiving different flow to NUMA node assignments from the secondary load balancing application instances 815, 825, and 835, the primary load balancing application instance 805 compiles the assignments into a single mapping table and distributes it to the secondary load balancing application instances 815, 825, and 835. In such embodiments, each instance of the distributed load balancing application then has all flow to NUMA node assignments needed for processing all flows.

Figure 9:
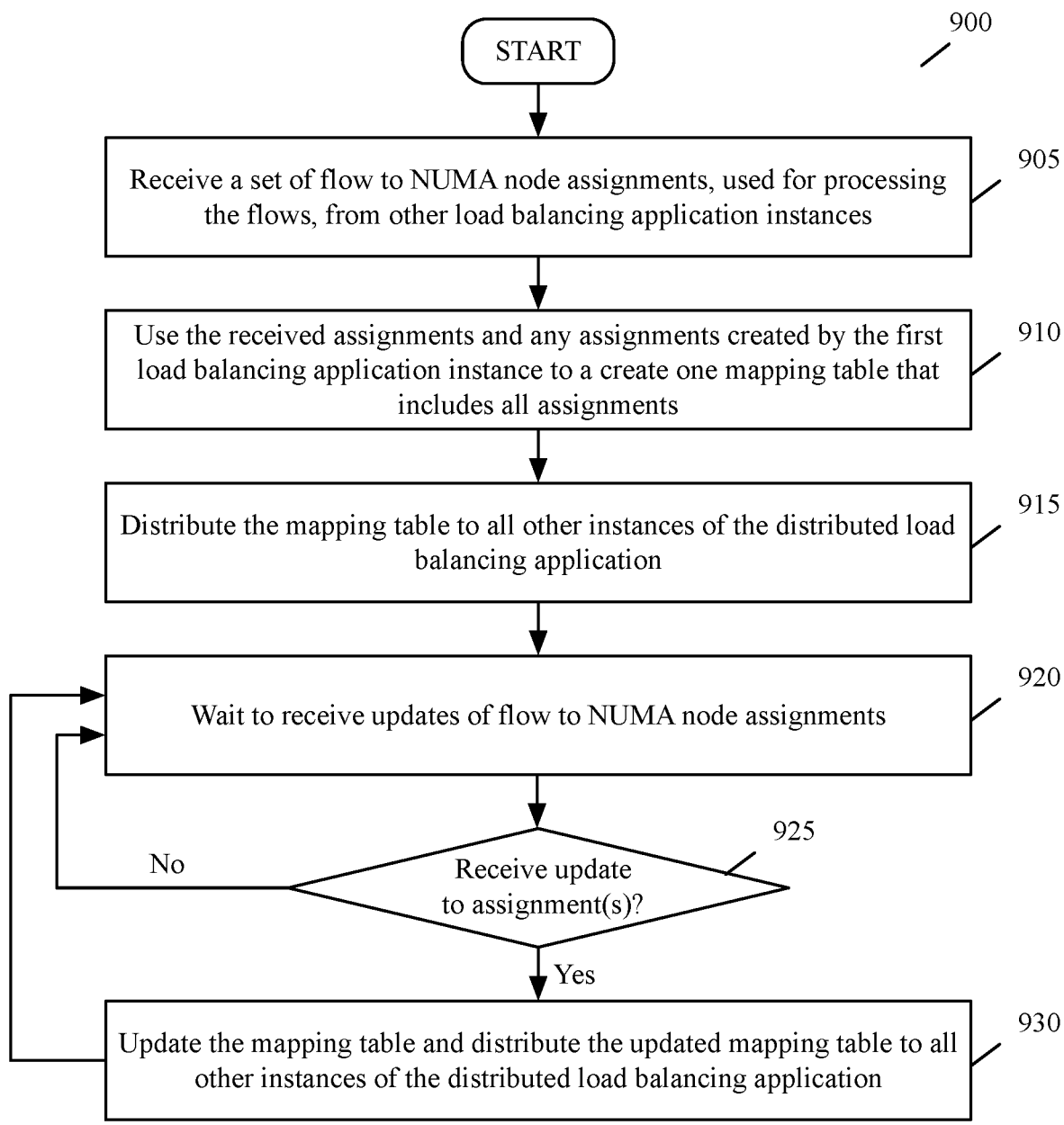
FIG. 9 conceptually illustrates a process of some embodiments for distributing assignments of flows to NUMA nodes to multiple instances of a distributed load balancing application.

FIG. 9 conceptually illustrates a process 900 of some embodiments for distributing assignments of flows to NUMA nodes to multiple instances of a distributed load balancing application. This process 900 is performed in some embodiments by a first load balancing application instance that is implemented on a first NUMA node and that is designated as a primary instance of the distributed load balancing application. In some embodiments, the distributed load balancing application includes several instances, each implemented on a different NUMA node of a NUMA appliance.

The process 900 begins by receiving (at 905) a set of flow to NUMA node assignments, used for processing the flows, from other load balancing application instances of the distributed load balancing application. In some embodiments, each instance initially assigns flows to different NUMA nodes. These assignments are made in some embodiments based on policies defined by a network administrator, and are made in other embodiments based on a load balancing algorithm performed by the instance itself. In some embodiments, an assignment includes a flow ID (e.g., an n-tuple of the flow) and a NUMA node ID associated with the NUMA node that is assigned to process the flow. The assignments are provided in some embodiments to the first load balancing application instance through processor interconnects (e.g., a QPI or UPI interconnect) that connect the NUMA nodes on which the load balancing application instances execute.

Next, the process 900 uses (at 910) the received assignments and any assignments created by the first load balancing application instance to create one mapping table that includes all of the assignments. In some embodiments, the first load balancing application instance also creates assignments of flows to NUMA nodes. The first load balancing application instance compiles all flow to NUMA node assignments into a single mapping table that specifies, for each flow, the NUMA node assigned to process it.

At 915, the process 900 distributes the mapping table to all other instances of the distributed load balancing application. By providing the mapping table to each other instance of the load balancing application, each instance is able to determine which NUMA node is assigned to process each flow. In some embodiments, a NUMA node receives a flow that is assigned to another NUMA node for processing. Using the mapping table, the NUMA node is able to determine which node is assigned to the flow in order to forward the flow to the assigned node.

Then, the process 900 waits (at 920) to receive updates of flow to NUMA node assignments. In some embodiments, any instance of the load balancing application can reassign flows to different NUMA nodes based on CPU capacities of the NUMA nodes, latencies of the NUMA nodes, loss percentage of the servers connected to the NUMA nodes, etc. In such embodiments, the first load balancing application instance waits to receive any updates to assignments in order to update the mapping table. In some embodiments, the first load balancing application instance also waits to receive new flow to NUMA node assignments for new flows.

At 925, the process 900 determines whether any updates to assignments have been received. Updates to assignments in some embodiments include a reassignment of a NUMA node for a flow and/or a new assignment of a NUMA node for a new flow. If the process 900 determines that no updates to assignments have been received, the process 900 returns to step 920 to continue waiting for updates to assignments. In some embodiments, the first load balancing application instance waits indefinitely for new and/or updated assignments (as shown in this figure). However, in other embodiments, the first load balancing application instance waits a specified period of time for new and/or updated assignments, and ends the process 900 after the specified period of time ends.

If the process 900 determines that one or more updates to assignments have been received, the process 900 updates (at 930) the mapping table and distributes the updated mapping table to all other instances of the distributed load balancing application. When the first load balancing application instance receives an updated assignment for a flow (e.g., specifying a different NUMA node for processing the flow), the first load balancing application updates the entry for that flow. When the first load balancing application instance receives a new assignment for a new flow, the first load balancing application instance adds a new entry for the flow to the mapping table.

In some embodiments, the first load balancing application instance provides only the new or updated entries of the mapping table to the other instances. In other embodiments, the first load balancing application instance provides the entire mapping table including the new/updated entries to the other instances. After distributing the updated mapping table, the process 900 returns to step 920 to continue waiting for updates to assignments. In some embodiments, the first load balancing application instance waits indefinitely for new and/or updated assignments (as shown in this figure). However, in other embodiments, the first load balancing application instance waits a specified period of time for new and/or updated assignments, and ends the process 900 after the specified period of time ends.

Figure 10:
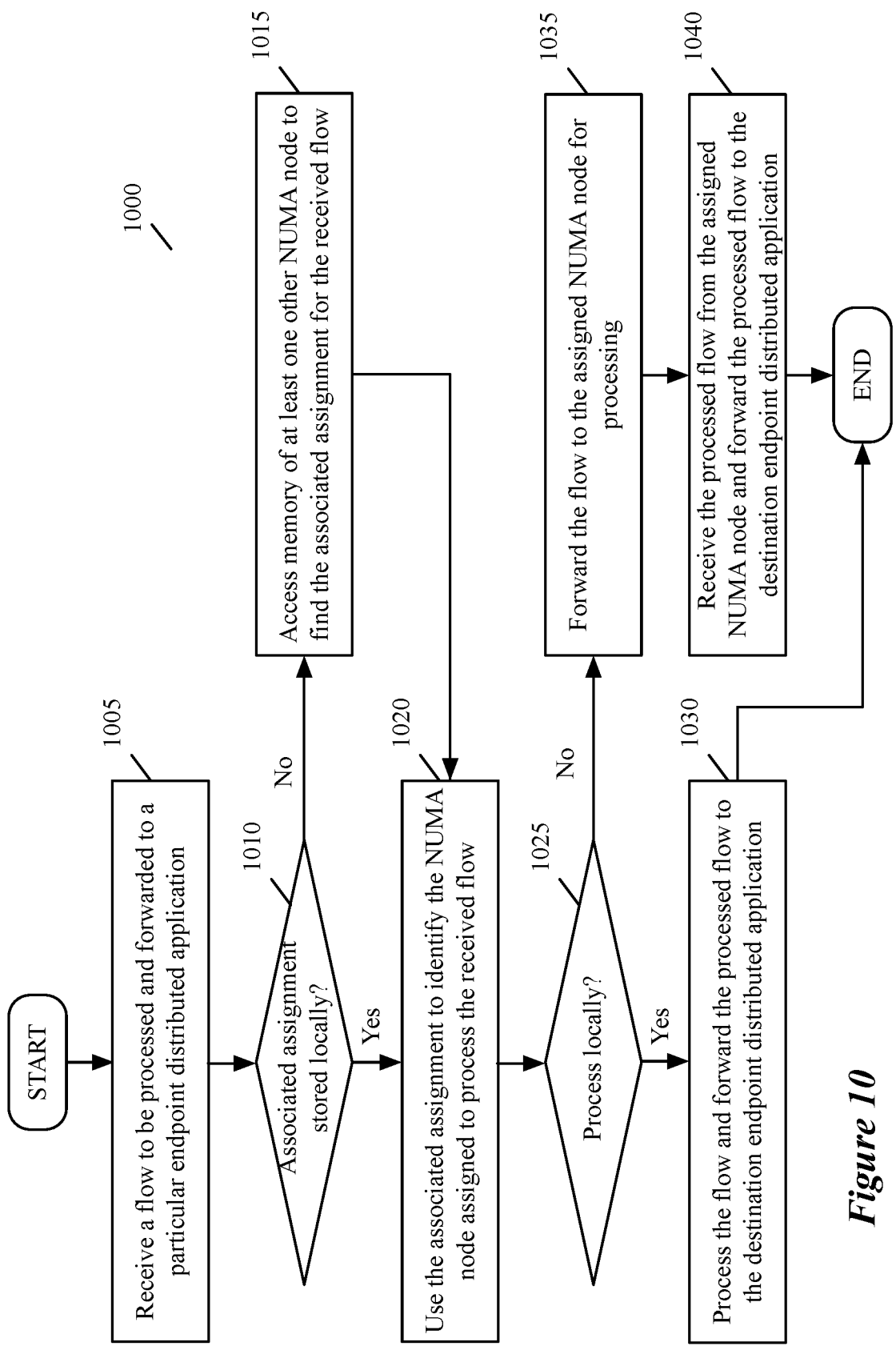
FIG. 10 conceptually illustrates a process of some embodiments for processing flows at different NUMA nodes based on assignments of NUMA nodes to the flows.

In some embodiments, flow to NUMA node assignments are not distributed among each NUMA node for local storing, and are instead each stored by the NUMA node that created the assignment because NUMA nodes are able to access each other's local memories. FIG. 10 conceptually illustrates a process 1000 of some embodiments for processing flows at different NUMA nodes based on assignments of NUMA nodes to the flows. This process 1000 is performed in some embodiments by a load balancing application implemented on a first NUMA node of a set of NUMA nodes. In some embodiments, each NUMA node in the set includes its own load balancing application for performing the process 1000.

The process 1000 begins by receiving (at 1005) a flow to be processed and forwarded to a particular endpoint distributed application. The load balancing application in some embodiments receives, from a particular client, a data message flow that is to be forwarded to a particular endpoint distributed application executing on one or more servers. The flow in some embodiments specifies a VIP address of the endpoint distributed application as the destination of the flow. In other embodiments, the flow specifies an FQDN associated with the endpoint distributed application. In some embodiments, the flow is received at the first NUMA node because it is connected to the NIC associated with the destination endpoint distributed application (i.e., to a particular instance of the destination endpoint distributed application specified by the FQDN).

Next, the process 1000 determines (at 1010) whether a flow to NUMA node assignment associated with the received flow is stored locally. The load balancing application in some embodiments performs a lookup in a mapping table stored in the first NUMA node's local memory in order to determine which NUMA node is assigned to process the flow. In some embodiments, the load balancing application uses the flow's ID (e.g., five tuple) to find a matching entry in the mapping table.

If the process 1000 determines that an associated assignment is not stored locally (i.e., if the load balancing application does not find an entry in the mapping table for the flow), the process 1000 accesses (at 1015) memory of at least one other NUMA node to find the assignment associated with the received flow. In some embodiments, the load balancing application directs the processor of the first NUMA node to request a flow to NUMA node assignment from one or more other NUMA nodes. This request is sent in some embodiments over a processor interconnect (e.g., a QPI or UPI bridge) connecting the first NUMA node to the other NUMA nodes.

In some embodiments, the load balancing application sends requests to other NUMA nodes one at a time, such that the load balancing application sends out a first request to a second NUMA node, waits to receive a response from the second NUMA node, and only sends a second request to a third NUMA node after receiving a response from the second NUMA node indicating that the second NUMA node does not have an assignment for the received flow. The load balancing application will continue sending out requests individually until it receives the assignment for the flow from one of the other NUMA nodes. In other embodiments, the load balancing application sends requests to other NUMA nodes simultaneously, such that the load balancing application sends out all requests to all other NUMA nodes at the same time in order to receive a response from all other NUMA nodes. Once the process 1000 finds the associated assignment for the received flow (i.e., which was stored in a memory of a different NUMA node), the process 1000 proceeds to step 1020, which will be described below.

If the process 1000 determines that an associated assignment is stored locally, the process 1000 uses (at 1020) the associated assignment to identify the NUMA node assigned to process the received flow. The associated assignment in some embodiments includes the flow ID and a NUMA node ID identifying the NUMA node assigned to process the flow.

After identifying the NUMA node assigned to process the flow, the process 1000 determines (at 1025) whether the flow is to be processed locally or not. Specifically, the process 1000 determines whether the NUMA node assigned to the flow is the first NUMA node (i.e., itself) or another NUMA node (i.e., a remote node). If the process 1000 determines that the flow is to be processed locally (i.e., that the assigned NUMA node is the first NUMA node), the process 1000 processes (at 1030) the flow and forwards the processed flow to the destination endpoint distributed application. After the load balancing application determines that the first NUMA node is the assigned node for the flow, it passes the flow to the processor and cores of the first NUMA node for processing and for forwarding to the destination endpoint distributed application. After processing and forwarding the flow, the process 1000 ends.

If the process 1000 determines that the flow is not to be processed locally (i.e., that the assigned NUMA node is not the first NUMA node), the process 1000 forwards (at 1035) the flow to the assigned NUMA node for processing. In some embodiments, the load balancing application directs the processor and cores of the first NUMA node to provide the flow to the processor and cores of the assigned NUMA node for processing. The flow is provided in some embodiments along the processor interconnect that connects the two NUMA nodes. In some embodiments, the assigned NUMA node processes the flow using its processor and cores to perform one or more middlebox services on the flow.

After forwarding the flow to the assigned NUMA node, the process 1000 receives (at 1040) the processed flow from the assigned NUMA node and forwards the processed flow to the destination endpoint distributed application. The first NUMA node receives, from the assigned NUMA node, the processed flow and forwards the processed flow to the destination endpoint distributed application instance through the NIC connected to the first NUMA node. After forwarding the processed flow, the process 1000 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
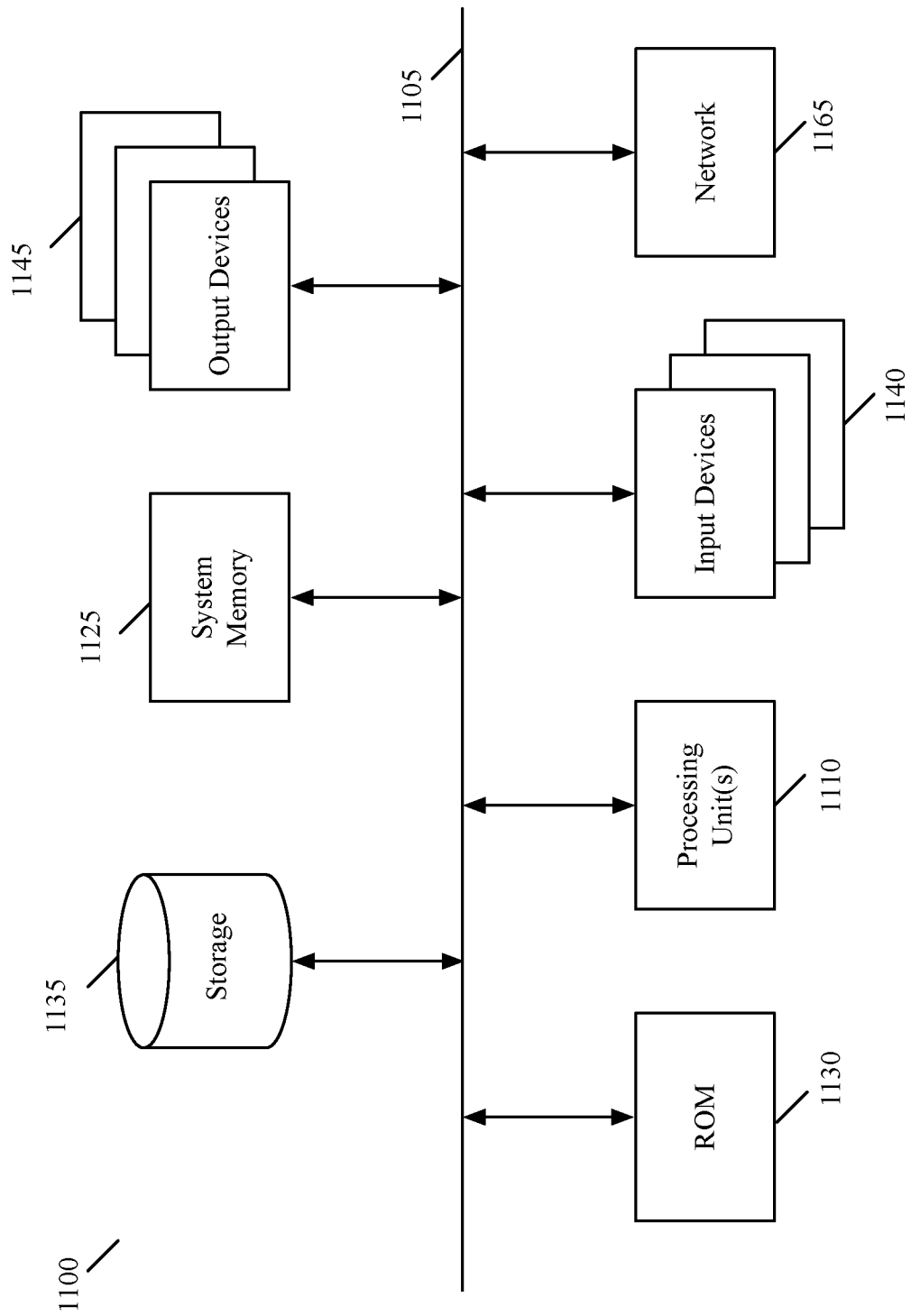
FIG. 11 conceptually illustrates an electronic system with which some embodiments of the invention are implemented.

FIG. 11 conceptually illustrates a computer system 1100 with which some embodiments of the invention are implemented. The computer system 1100 can be used to implement any of the above-described computers and servers. As such, it can be used to execute any of the above described processes. This computer system includes various types of non-transitory machine readable media and interfaces for various other types of machine readable media. Computer system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the computer system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments. The read-only-memory (ROM) 1130 stores static data and instructions that are needed by the processing unit(s) 1110 and other modules of the computer system. The permanent storage device 1135, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1135.

Other embodiments use a removable storage device (such as a flash drive, etc.) as the permanent storage device. Like the permanent storage device 1135, the system memory 1125 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the computer system. The input devices 1140 include alphanumeric keyboards and pointing devices (also called "cursor control devices"). The output devices 1145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples computer system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of computer system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2, 6, 9, and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for dynamically processing data message flows using different non-uniform memory access (NUMA) nodes of a processing system, each NUMA node comprising a local memory and a set of processors that can access data from local memories of other NUMA nodes, the method comprising:
    at a load balancing application associated with a first NUMA node:
        receiving data message flows destined for an endpoint application, wherein the data message flows are assigned to the first NUMA node to be forwarded to the endpoint application;
        monitoring a central processing (CPU) usage of the first NUMA node to determine whether the CPU usage of the first NUMA node exceeds a particular threshold;
        when the CPU usage of the first NUMA node exceeds the particular threshold, reassigning at least a subset of the data message flows to the second NUMA node for processing;
    wherein unencapsulated flows are reassigned to the second NUMA node and encapsulated flows maintain assignment to the first NUMA node.

2. The method of claim 1 further comprising:
    after reassigning the at least subset of data message flows to the second NUMA node:
        forwarding the at least subset of data message flows to the second NUMA node to be processed;
        receiving processed data message flows from the second NUMA node; and
        forwarding the processed data message flows to the endpoint application.

3. The method of claim 1, wherein the at least subset of data message flows comprises large data messages such that data message flows comprising small data messages maintain assignment to the first NUMA node.

4. The method of claim 1, wherein the data message flows are initially assigned to the first NUMA node based on quality of service (QOS) parameters of the endpoint application.

5. The method of claim 4, wherein the data message flows are initially assigned by a network administrator.

6. The method of claim 4, wherein the data message flows are initially assigned by the load balancing application.

7. The method of claim 4, wherein the data message flows are initially assigned to the first NUMA node because the data message flows are critical data message flows.

8. The method of claim 7, wherein the critical data message flows are flows requiring a low latency.

9. The method of claim 7, wherein the data message flows are a first set of data message flows, the endpoint application is a first endpoint application, and a second set of data message flows associated with a second endpoint application is assigned to the second NUMA node.

10. The method of claim 9, wherein:
the first endpoint application is implemented by a first set of endpoint application instances,
the second endpoint application is implemented by a second set of endpoint application instances, and
the first and second sets of endpoint application instances execute on a set of one or more servers.

11. The method of claim 9, wherein:
the first endpoint application is implemented by a first set of endpoint application instances executing on a first set of one or more servers, and
the second endpoint application is implemented by a second set of endpoint application instances executing on a second set of one or more servers.

12. The method of claim 9, wherein the second set of data message flows is assigned to the second NUMA node because the second set of data message flows is a set of non-critical data message flows while the first set of data message flows is a set of critical data message flows.

13. The method of claim 12, wherein the critical flows are flows requiring a low latency and the set of non-critical flows are flows not requiring a low latency.

14. The method of claim 1, wherein the load balancing application is a first instance of a distributed load balancing application implemented by a plurality of instances operating on the different NUMA nodes.

15. The method of claim 1 further comprising, after the reassigning, storing a record, associating the at least subset of data message flows with the second NUMA node, in the local memory of the first NUMA node.

16. The method of claim 15, wherein the record specifies, for each data message flow in the at least subset of data message flows, a flow identifier (ID) identifying the data message flow and a NUMA node ID identifying the second NUMA node.

17. The method of claim 1, wherein the data message flows specify a fully qualified domain name (FQDN), specifying the endpoint application, as a destination of the data message flows.

18. The method of claim 17, wherein the endpoint application is implemented by a set of endpoint application instances, and the FQDN specifies a particular endpoint application instance as the destination of the data message flows.

19. A non-transitory machine readable medium storing a program for execution by at least one processing unit for dynamically processing data message flows using different non-uniform memory access (NUMA) nodes of a processing system, each NUMA node comprising a local memory and a set of processors that can access data other local memories of other NUMA nodes, the program comprising sets of instructions for:
at a load balancing application associated with a first NUMA node:
receiving data message flows destined for an endpoint application, wherein the data message flows are assigned to the first NUMA node to be forwarded to the endpoint application;
monitoring a central processing (CPU) usage of the first NUMA node to determine whether the CPU usage of the first NUMA node exceeds a particular threshold;
when the CPU usage of the first NUMA node exceeds the particular threshold, reassigning at least a subset of the data message flows to the second NUMA node for processing;
wherein unencapsulated flows are reassigned to the second NUMA node and encapsulated flows maintain assignment to the first NUMA node.

* * * * *